US012742907B2

(12) United States Patent
Chang et al.

(10) Patent No.: US 12,742,907 B2
(45) Date of Patent: Sep. 22, 2026

(54) OPTICAL LENS AND ELECTRONIC DEVICE

(71) Applicant: LARGAN PRECISION CO., LTD., Taichung City (TW)

(72) Inventors: Pei-Chi Chang, Taichung City (TW); Chen-Wei Fan, Taichung City (TW); Ming-Ta Chou, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 317 days.

(21) Appl. No.: 18/395,874

(22) Filed: Dec. 26, 2023

(65) Prior Publication Data

US 2024/0210593 A1 Jun. 27, 2024

(30) Foreign Application Priority Data

Dec. 27, 2022 (TW) .................................. 111150235
Jul. 21, 2023 (CN) ........................ 202310900532.X

(51) Int. Cl.
*G02B 1/00* (2006.01)

(52) U.S. Cl.
CPC .................................... *G02B 1/002* (2013.01)

(58) Field of Classification Search
CPC ...................................................... G02B 1/002
USPC .......................................................... 359/642
See application file for complete search history.

(56) References Cited

U.S. PATENT DOCUMENTS

| | | | |
|---|---|---|---|
| 8,455,810 | B2 | 6/2013 | Tomioka |
| 8,947,795 | B2 | 2/2015 | Kobayashi |
| 8,964,314 | B2 | 2/2015 | Koike |
| 10,288,833 | B2 | 5/2019 | Tobita |
| 10,527,814 | B2 | 1/2020 | Komiyama et al. |
| 2009/0086341 | A1 | 4/2009 | Kikuchi |
| 2010/0018252 | A1 | 1/2010 | Zou |
| 2012/0224267 | A1 | 9/2012 | Kikuchi |
| 2014/0118852 | A1 | 5/2014 | Komiyama |
| 2014/0334019 | A1 | 11/2014 | Ishiguri |

(Continued)

FOREIGN PATENT DOCUMENTS

| | | | |
|---|---|---|---|
| CN | 1871536 | A | 11/2006 |
| CN | 206387955 | U | 8/2017 |

(Continued)

*Primary Examiner* — Sharrief I Broome

(74) *Attorney, Agent, or Firm* — McClure, Qualey & Rodack, LLP

(57) ABSTRACT

An optical lens includes a composite lens. The composite lens includes an optical portion and an extending portion. An optical axis passes through the optical portion, and the optical portion includes a first optical surface, a second optical surface and a connecting surface. A light passes through the first optical surface to enter the optical portion. The second optical surface is corresponding to the first optical surface, and the light passes through the second optical surface to exit the optical portion. The connecting surface is connected to the first optical surface and the second optical surface. The extending portion surrounds and covers the connecting surface, and the extending portion supports and fixes the optical portion. The optical portion is made of glass material, the extending portion is made of plastic material, and the extending portion includes gate traces axially and symmetrically disposed on the extending portion.

33 Claims, 40 Drawing Sheets

(56) References Cited

U.S. PATENT DOCUMENTS

| | | | | |
|---|---|---|---|---|
| 2015/0323757 | A1* | 11/2015 | Bone | B29D 11/00432 359/819 |
| 2018/0088297 | A1* | 3/2018 | Komiyama | G02B 7/021 |
| 2019/0187402 | A1 | 6/2019 | Masuzawa | |
| 2019/0302393 | A1* | 10/2019 | Shirotori | G02B 7/022 |
| 2020/0110240 | A1 | 4/2020 | Wang | |
| 2020/0292779 | A1* | 9/2020 | Tsai | H04N 23/55 |
| 2020/0341228 | A1* | 10/2020 | Wu | H04N 23/55 |
| 2022/0043183 | A1 | 2/2022 | Motegi | |
| 2023/0273411 | A1* | 8/2023 | Chang | G02B 13/0055 359/822 |

FOREIGN PATENT DOCUMENTS

| | | | |
|---|---|---|---|
| CN | 107561822 | A | 1/2018 |
| CN | 107884901 | A | 4/2018 |
| CN | 109298499 | A | 2/2019 |
| CN | 111025514 | A | 4/2020 |
| CN | 217404608 | U | 9/2022 |
| JP | 2004231477 | A | 8/2004 |
| JP | 2008191412 | A | 8/2008 |
| JP | 2009255468 | A | 11/2009 |
| JP | 4930773 | B2 | 5/2012 |

* cited by examiner

110

210

30

40

OPTICAL LENS AND ELECTRONIC DEVICE

RELATED APPLICATIONS

This application claims priority to Taiwan Application Serial Number 111150235, filed Dec. 27, 2022 and China Application Serial Number 202310900532.X, filed Jul. 21, 2023, which are herein incorporated by reference.

BACKGROUND

Technical Field

The present disclosure relates to an optical lens. More particularly, the present disclosure relates to an optical lens applicable to portable electronic devices.

Description of Related Art

In recent years, portable electronic devices have developed rapidly. For example, intelligent electronic devices and tablets have been filled in the lives of modern people, and optical lenses mounted on portable electronic devices have also prospered. However, as technology advances, the quality requirements of the optical lens are becoming higher and higher. Therefore, an optical lens, which can improve the manufacturing quality, needs to be developed.

SUMMARY

According to one aspect of the present disclosure, an optical lens includes a composite lens, wherein the composite lens includes an optical portion and an extending portion. An optical axis passes through the optical portion, and the optical portion includes a first optical surface, a second optical surface and a connecting surface. A light passes through the first optical surface to enter the optical portion. The second optical surface is corresponding to the first optical surface, and the light passes through the second optical surface to exit the optical portion. The connecting surface surrounds the optical axis and is connected to the first optical surface and the second optical surface. The extending portion surrounds and covers the connecting surface, and the extending portion supports and fixes the optical portion. The optical portion is made of glass material, the extending portion is made of plastic material, and the extending portion includes at least two gate traces axially and symmetrically disposed on the extending portion.

According to one aspect of the present disclosure, an optical lens includes a composite lens. The composite lens includes an optical portion and an extending portion. An optical axis passes through the optical portion. The optical portion includes a first optical surface, a second optical surface and a connecting surface. A light passes through the first optical surface to enter the optical portion. The second optical surface is corresponding to the first optical surface, and the light passes through the second optical surface to exit the optical portion. The connecting surface surrounds the optical axis and is connected to the first optical surface and the second optical surface. The extending portion surrounds and covers the connecting surface, wherein the extending portion is attached to the optical portion and extends towards a direction close to the optical axis, and a first light through hole and a second light through hole are formed on the first optical surface and the second optical surface via the extending portion, respectively. The optical portion is made of glass material, the extending portion is made of plastic material, a contour of the first light through hole is defined via a first inner peripheral surface, a contour of the second light through hole is defined via a second inner peripheral surface, an angle between the first inner peripheral surface and the second inner peripheral surface is θt, and the following condition is satisfied: 27 degrees<θt<171 degrees.

According to one aspect of the present disclosure, an electronic device includes the optical lens of any one of the aforementioned aspects.

DETAILED DESCRIPTION

Figure 1A:
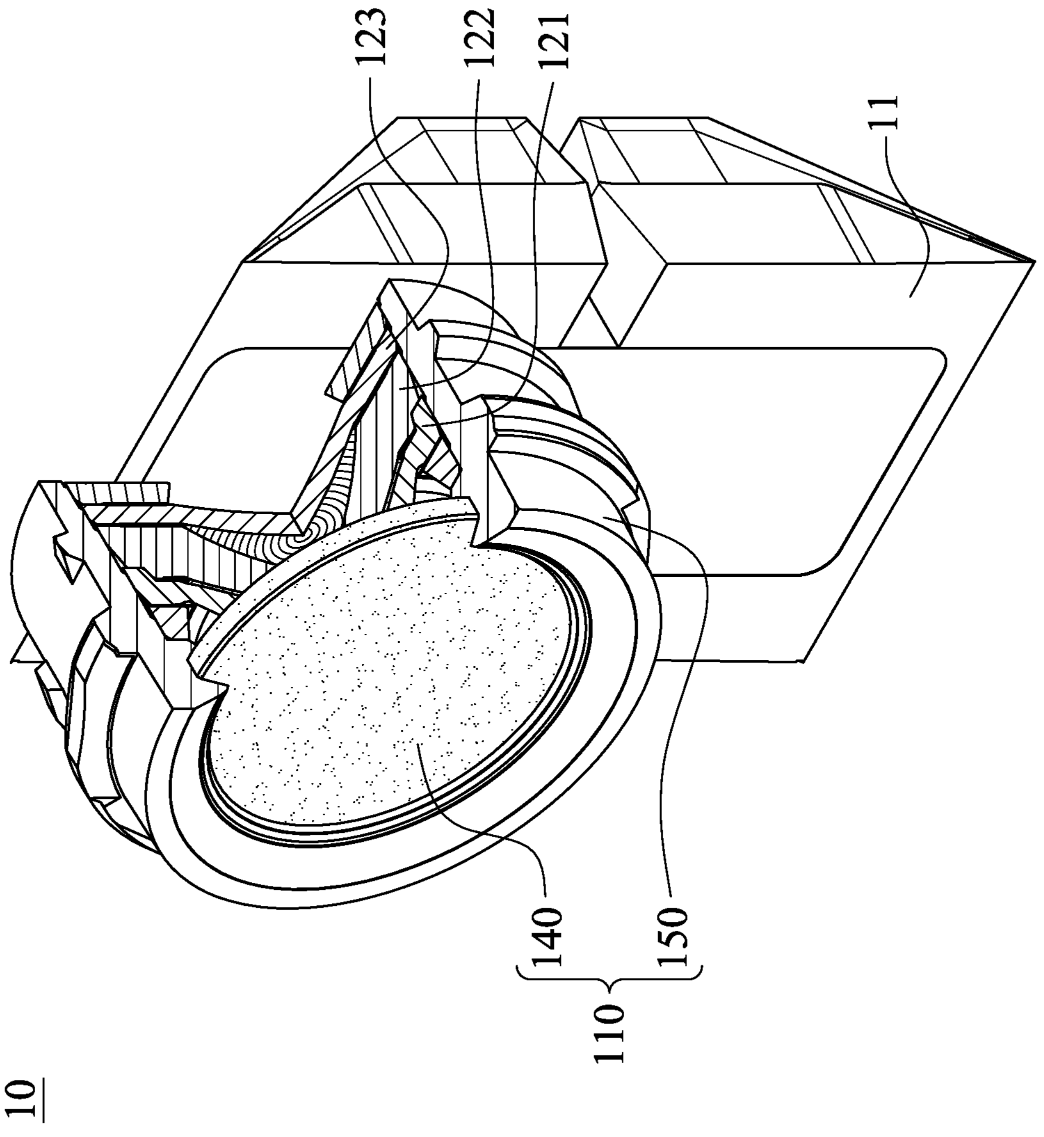
FIG. 1A is a partial cross section of an electronic device according to the 1st embodiment of the present disclosure.

The present disclosure provides an optical lens, which includes a composite lens, wherein the composite lens includes an optical portion and an extending portion. The optical portion includes a first optical surface, a second optical surface and a connecting surface, and an optical axis passes through the optical portion, wherein a light passes through the first optical surface to enter the optical portion, the second optical surface is corresponding to the first optical surface, the light passes through the second optical surface to exit the optical portion, and the connecting surface surrounds the optical axis and is connected to the first optical surface and the second optical surface. The extending portion is opaque, the extending portion surrounds and covers the connecting surface, the extending portion and the optical portion are integrally formed, and the extending portion supports and fixes the optical portion. Hence, the assembling error can be reduced via the composite lens.

The extending portion can be attached to the optical portion and extend towards a direction close to the optical axis. Therefore, the optical portion can be more stable by simultaneously covering the first optical surface and the second optical surface via the extending portion.

A light through hole is formed on one of the first optical surface and the second optical surface via the extending portion, and another light through hole is formed on another one of the first optical surface and the second optical surface via the extending portion. In detail, a first light through hole and a second light through hole are formed on the first optical surface and the second optical surface via the extending portion, respectively. Hence, the stray light can be further reduced by disposing the first light through hole and the second light through hole on the first optical surface and the second optical surface, respectively.

The extending portion can include at least two gate traces axially and symmetrically disposed on the extending portion. Therefore, the manufacturing quality of the composite lens can be improved by axially and symmetrically disposing the gate traces.

The optical portion can be made of glass material, and the extending portion can be made of plastic material, wherein the optical portion can further be a molded glass or a ground glass, but the present disclosure is not limited thereto. Therefore, the optical portion made of glass material is favorable for enhancing the environmental tolerance of the optical lens, and the plastic material is easier to process than the glass material to process, so that the extending portion made of plastic material is favorable for enhancing the design freedom of the optical lens.

The optical lens can further include a lens element adjacently disposed with the composite lens along the optical axis, and the extending portion can have a plane and a frustum surface. In detail, the plane and the frustum surface are physically contacted with the lens element. Hence, the extending portion can have the embedded function via the plane and the frustum surface, so that the composite lens and the lens element are assembled and positioned.

Both of the first optical surface and the second optical surface can be convex surfaces, so that the volume of the optical lens can be reduced.

The extending portion can further include a light diminishing structure, wherein a surface contour of the extending portion is undulating via the light diminishing structure. Therefore, the reflection of the stray light can be reduced.

When a glass transition temperature of the optical portion is TgO, and a glass transition temperature of the extending portion is TgE, the following condition can be satisfied: 147° C.≤TgO—TgE≤643° C. In particular, the optical portion is more stable under the condition that the optical portion has the higher glass transition temperature, so that the optical portion is not easily affected via the temperature of the mold during the insert molding of the optical portion.

When a contour of the light through hole is defined via an inner peripheral surface, a contour of another light through hole is defined via another inner peripheral surface, and an angle between the inner peripheral surface and the optical axis is a, the following condition can be satisfied: 3 degrees<θa<73 degrees. Therefore, it is favorable for avoiding the image quality to be affected by the stray light. Further, the following condition can be satisfied: 10 degrees<θa<53 degrees. Moreover, when a contour of the first light through hole is defined via a first inner peripheral surface, a contour of the second light through hole is defined via a second inner peripheral surface, an angle between the first inner peripheral surface and the optical axis is θa1, and an angle between the second inner peripheral surface and the optical axis is θa2, the following conditions can be satisfied: 3 degrees<θa1<73 degrees; and 3 degrees<θa2<73 degrees. Further, the following conditions can be satisfied: 10 degrees<θa1<41 degrees; and 24 degrees<θa2<53 degrees.

When a contact angle is formed between the inner peripheral surface and the optical portion on an edge of the light through hole, and the contact angle is θb, the following condition can be satisfied: 15 degrees<θb<87 degrees. Therefore, the molding quality of the light through hole can be enhanced. Further, the following condition can be satisfied: 44 degrees<θb<87 degrees. Furthermore, when a contact angle is formed between the first inner peripheral surface and the optical portion on an edge of the first light through hole, and the contact angle is θb1; a contact angle is formed between the second inner peripheral surface and the optical portion on an edge of the second light through hole, and the contact angle is θb2, the following conditions can be satisfied: 15 degrees<θb1<87 degrees; and 15 degrees<θb2<87 degrees. Further, the following conditions can be satisfied: 59 degrees<θb1<87 degrees; and 44 degrees<θb2<87 degrees.

When a diameter of the optical portion is φO, and a diameter of the light through hole is PH, the following condition can be satisfied: 1.07<φO/φH<3.8. When the extending portion has higher proportion of extending towards the optical axis, the optical portion can be more stable. Therefore, the aforementioned structure is favorable for blocking the stray light from passing through the optical surface. Moreover, when the diameter of the optical portion is φO, and a diameter of the first light through hole is φH1, the following condition can be satisfied: 1.07<φO/φH1<3.8.

When the inner peripheral surface is a first inner peripheral surface, the another inner peripheral surface is a second inner peripheral surface, and an angle between the first inner peripheral surface and the second inner peripheral surface is θt, the following condition can be satisfied: 27 degrees<θt<171 degrees. Further, the following condition can be satisfied: 85 degrees<θt<135 degrees.

When a diameter of the lens element is φL, and a diameter of the optical portion is φO, the following condition can be satisfied: 1.04<φL/φO<3.1. Therefore, more diverse optical design can be achieved.

Each of the aforementioned features of the optical lens can be utilized in various combinations for achieving the corresponding effects.

The present disclosure provides an electronic device, which includes the aforementioned optical lens. Moreover, the electronic device can be a cell phone, a vehicle device, a virtual reality (VR) or an augmented reality (AR), but the present disclosure is not limited thereto.

According to the aforementioned embodiment, specific embodiments and examples are provided, and illustrated via figures.

1st Embodiment

Figure 1B:
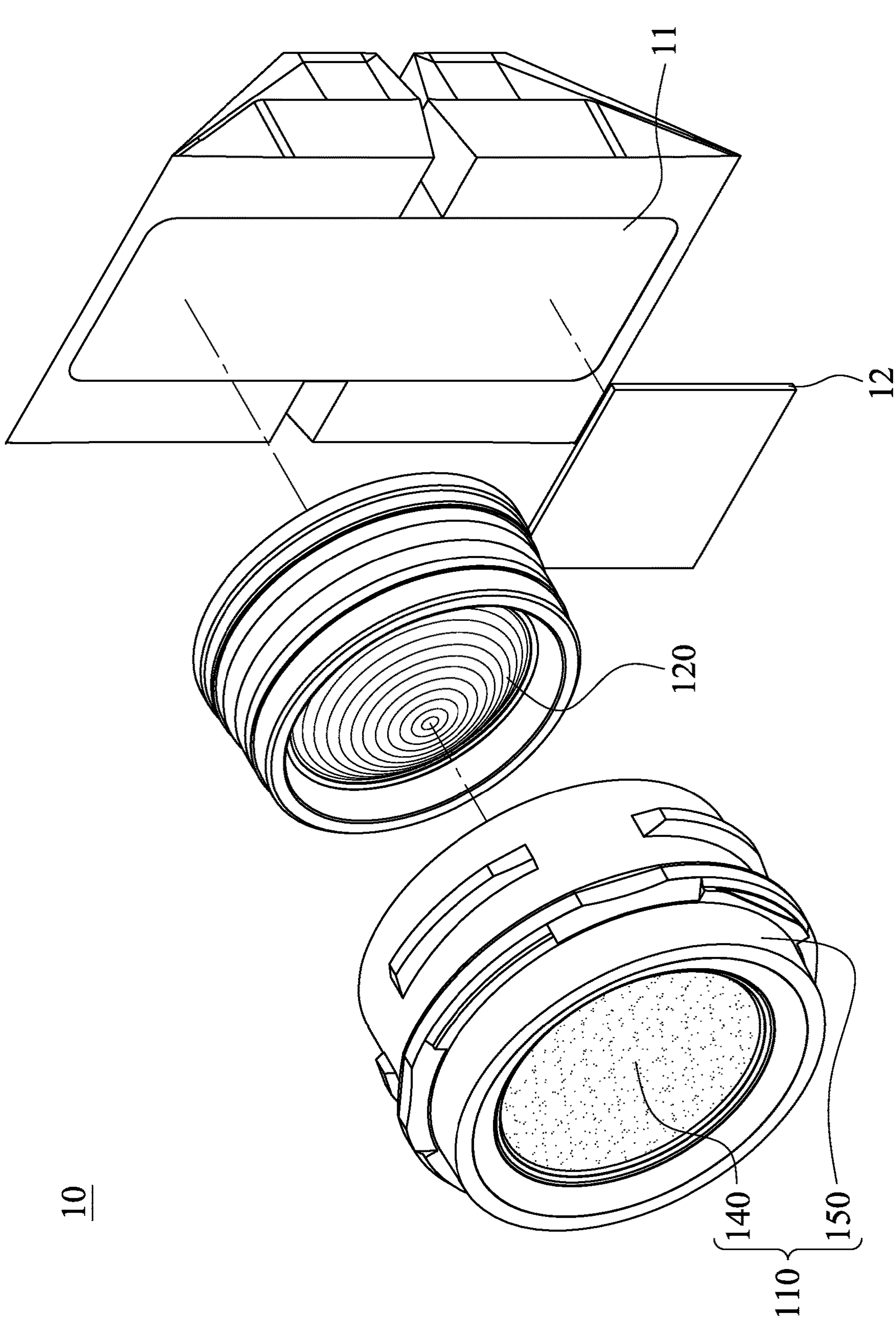
FIG. 1B is an exploded view of the electronic device according to the 1st embodiment in FIG. 1A.
Figure 1C:
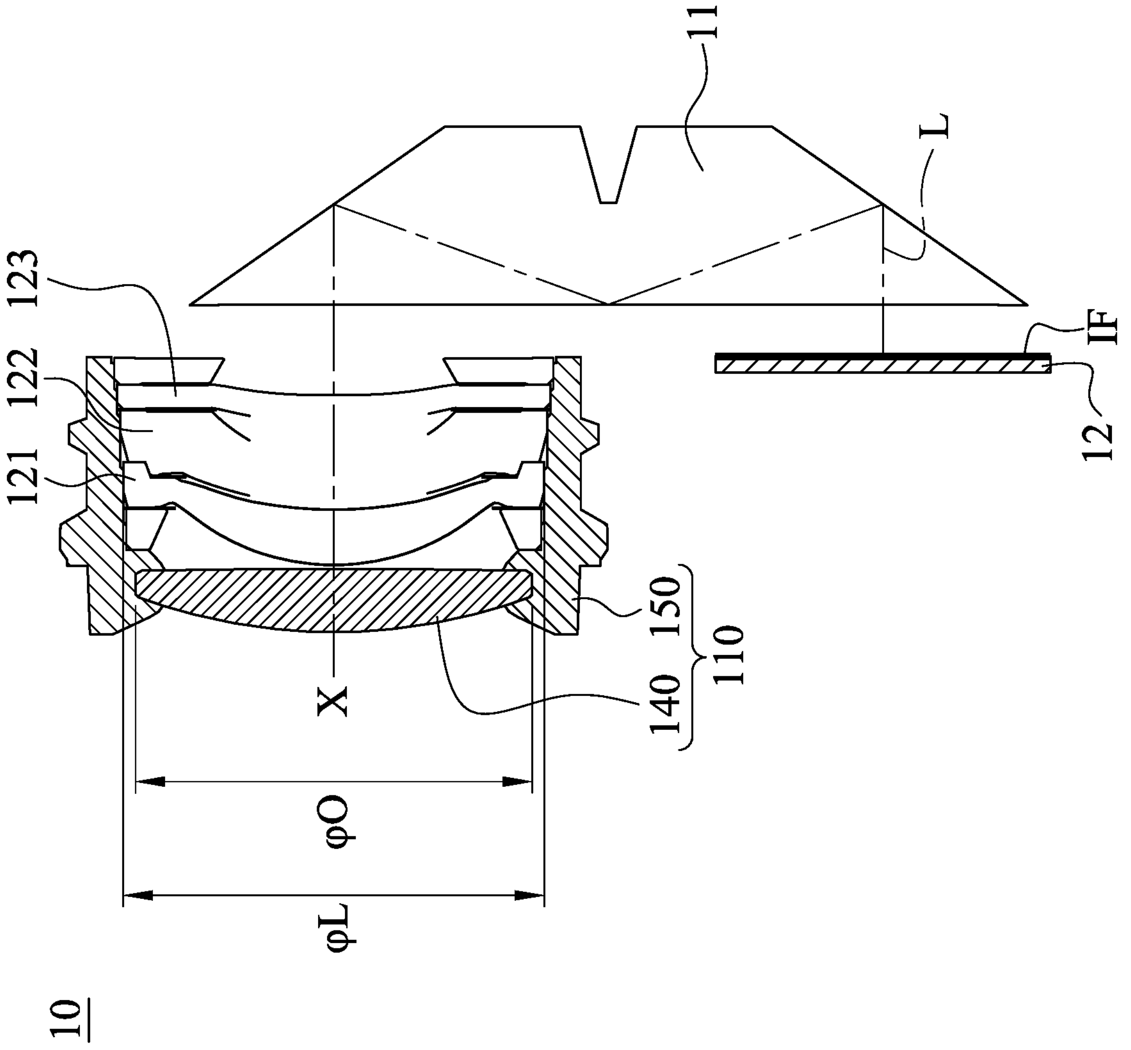
FIG. 1C is a cross-sectional view of the electronic device according to the 1st embodiment in FIG. 1A.

FIG. 1A is a partial cross section of an electronic device 10 according to the 1st embodiment of the present disclosure. FIG. 1B is an exploded view of the electronic device 10 according to the 1st embodiment in FIG. 1A. FIG. 1C is a cross-sectional view of the electronic device 10 according to the 1st embodiment in FIG. 1A. In FIGS. 1A to 1C, the electronic device 10 includes an optical lens (its reference numeral is omitted), a light folding element 11 and an image sensor 12, wherein the light folding element 11 is disposed on an image side of the optical lens, and the image sensor 12 is disposed on an image surface IF of the optical lens. Moreover, the electronic device 10 can be a cell phone, a vehicle device, a virtual reality or an augmented reality, but the present disclosure is not limited thereto.

The optical lens includes a composite lens 110 and a lens assembly 120, wherein the lens assembly 120 includes a plurality of lens elements 121, 122, 123, and the composite lens 110 includes an optical portion 140 and an extending portion 150. Furthermore, the composite lens 110 can have the accommodating function for accommodating the lens assembly 120, wherein the optical portion 140 of the composite lens 110 is disposed on an object side of the lens assembly 120, and the lens element 121 is adjacently disposed with the composite lens 110 along an optical axis X. In particular, the assembling error can be reduced via the composite lens 110.

In detail, the optical portion 140 can be made of glass material, and the extending portion 150 can be made of plastic material, wherein the optical portion 140 can further be a molded glass or a ground glass, but the present disclosure is not limited thereto. Therefore, the optical portion 140 made of glass material is favorable for enhancing the environmental tolerance of the optical lens, and the plastic material is easier to process than the glass material to process, so that the extending portion 150 made of plastic material is favorable for enhancing the design freedom of the optical lens.

Figure 1D:
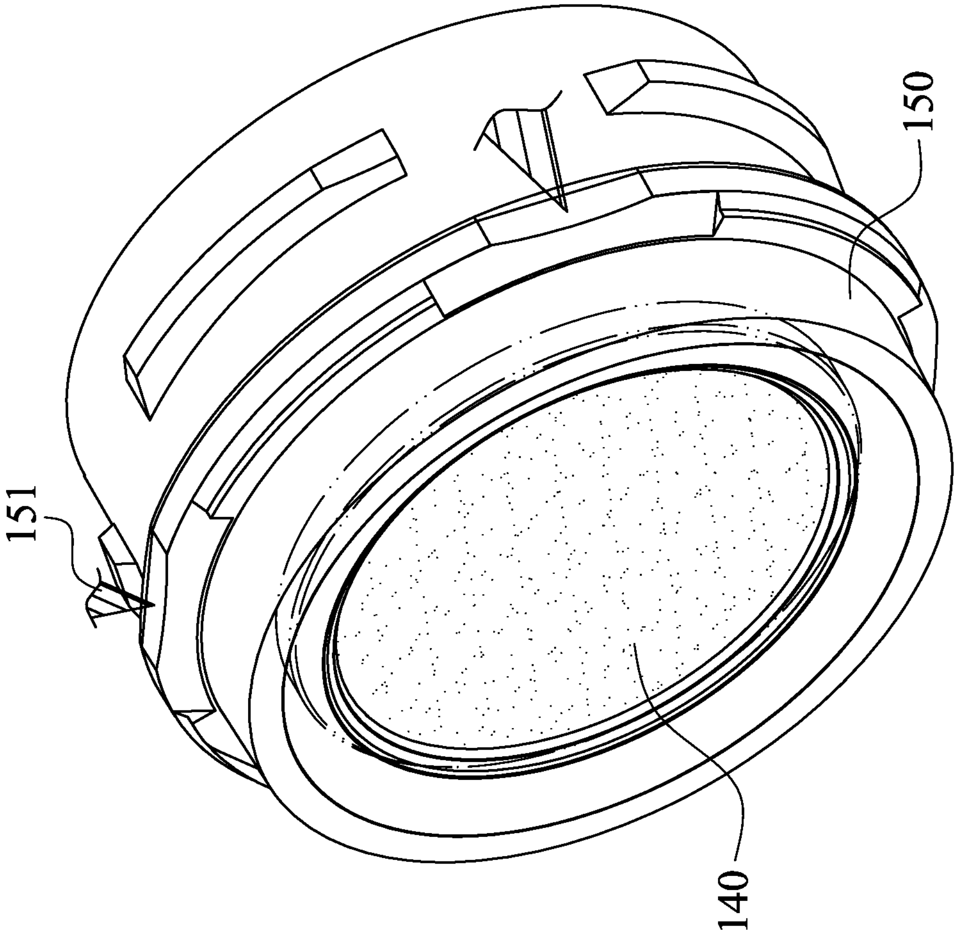
FIG. 1D is a three-dimensional perspective view of the composite lens according to the 1st embodiment in FIG. 1A.
Figure 1E:
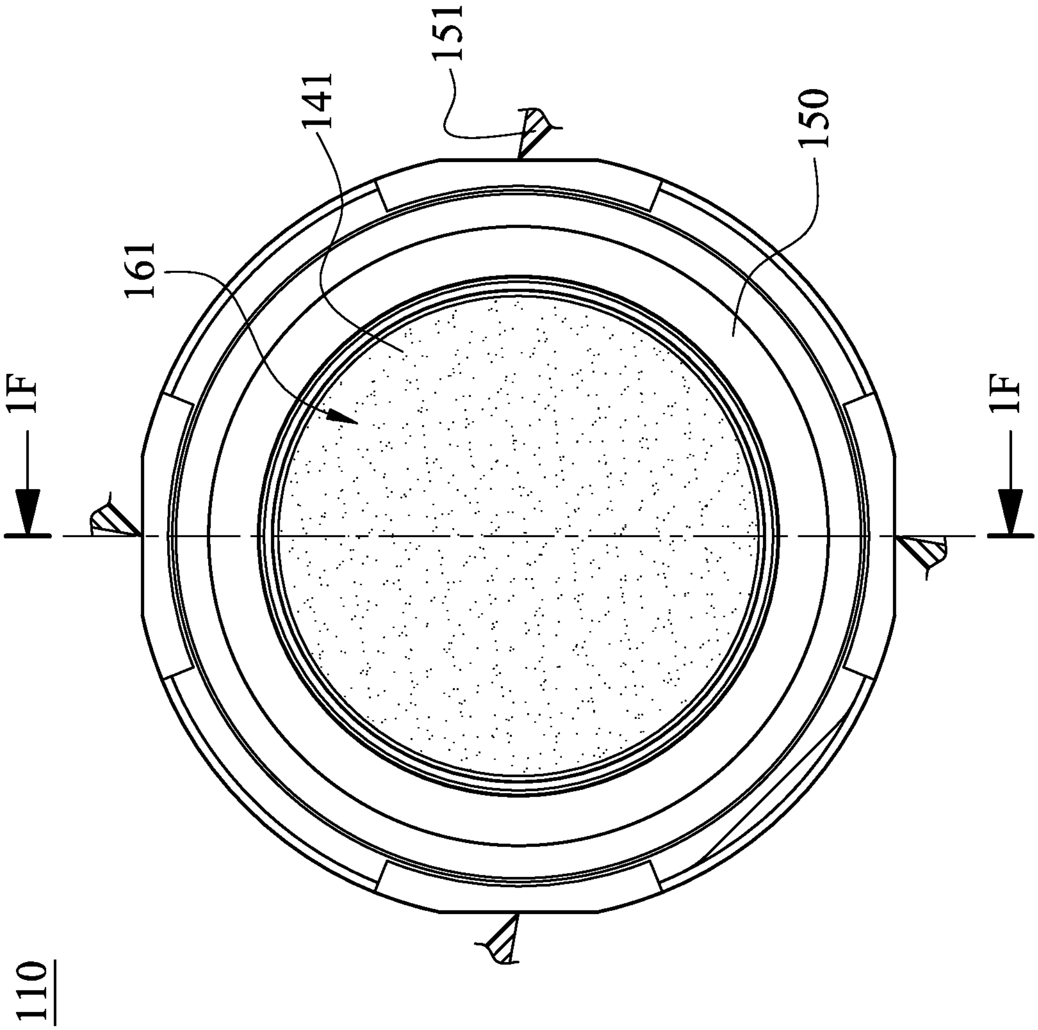
FIG. 1E is a top view of the composite lens according to the 1st embodiment in FIG. 1A.
Figure 1F:
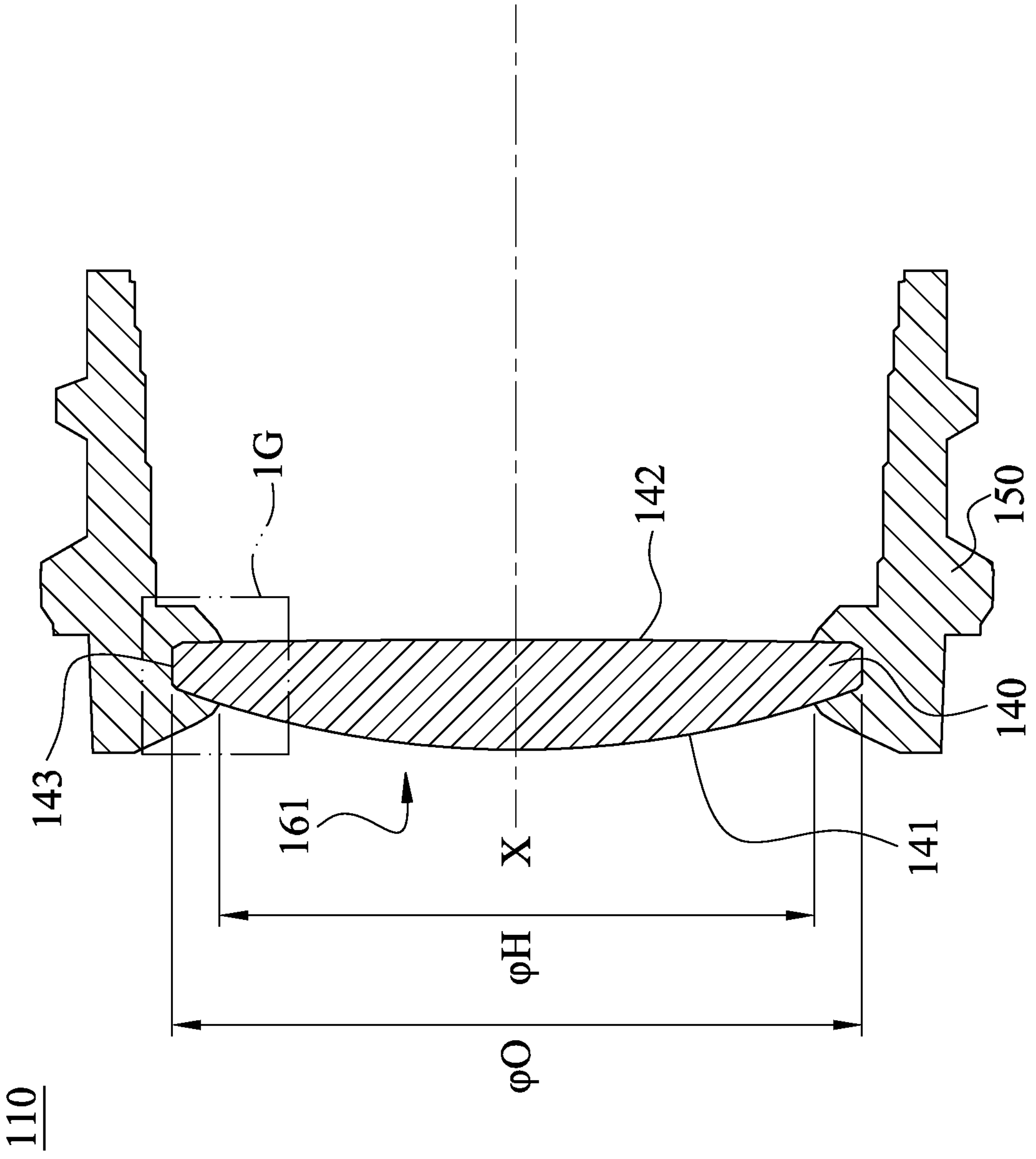
FIG. 1F is a cross-sectional view of the composite lens along a 1F-1F line in FIG. 1E.
Figure 1G:
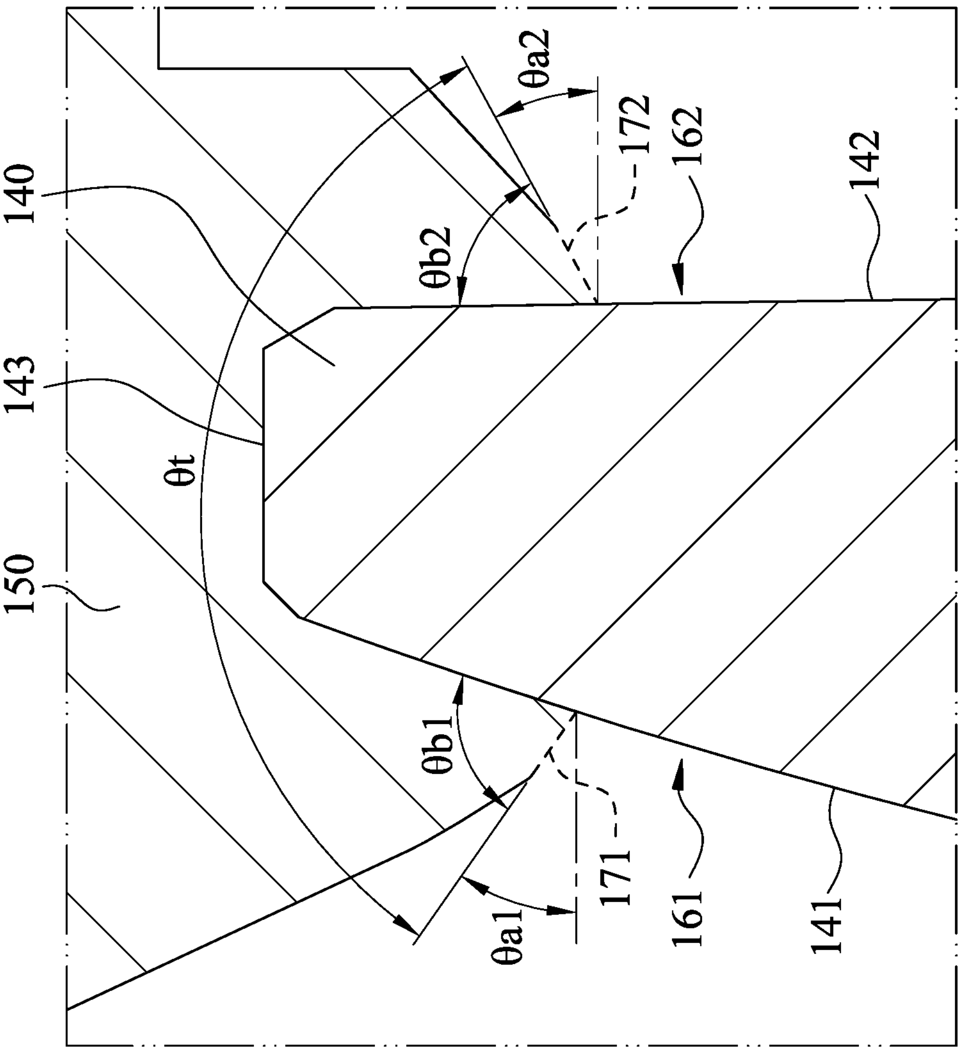
FIG. 1G is a partial enlarged view of the composite lens according to the 1st embodiment in FIG. 1F.
Figure 1H:
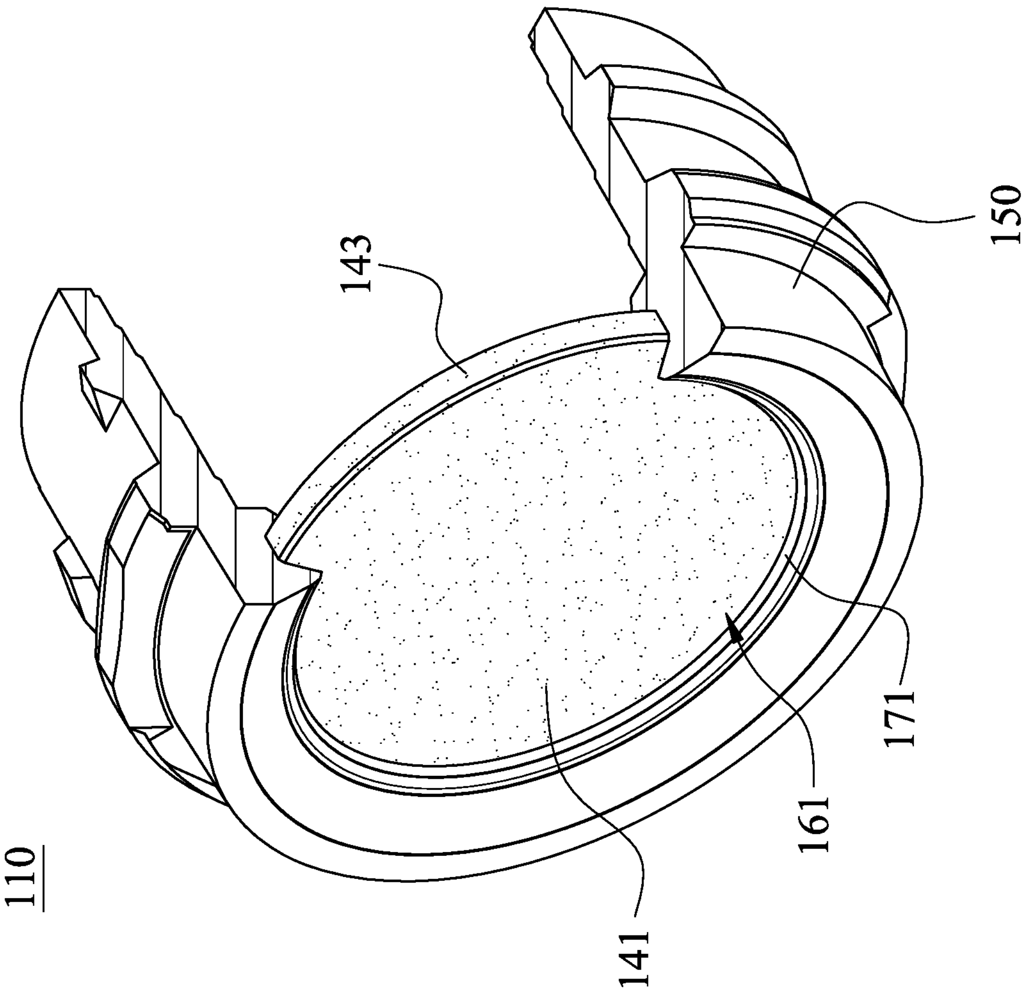
FIG. 1H is a partial cross section of the composite lens according to the 1st embodiment in FIG. 1A.
Figure 1I:
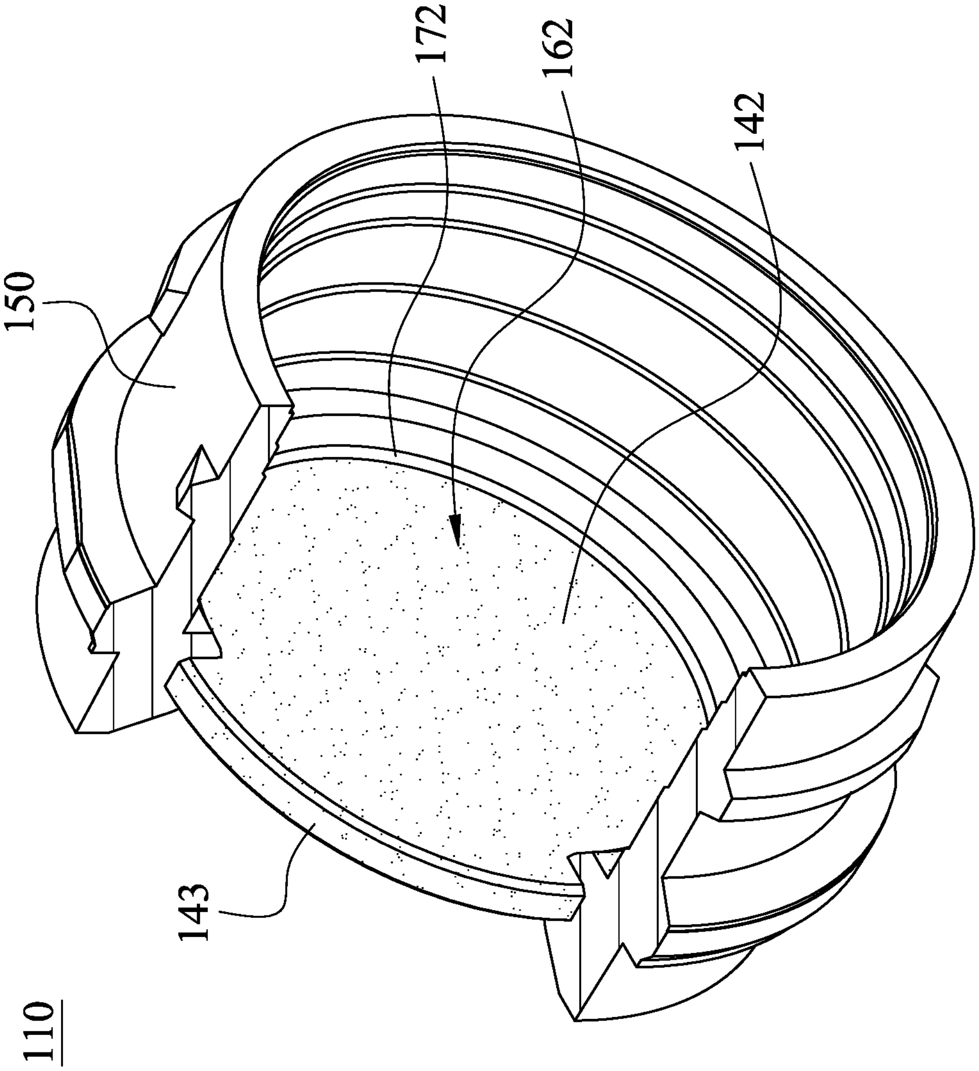
FIG. 1I is another partial cross section of the composite lens according to the 1st embodiment in FIG. 1A.

FIG. 1D is a three-dimensional perspective view of the composite lens 110 according to the 1st embodiment in FIG. 1A. FIG. 1E is a top view of the composite lens 110 according to the 1st embodiment in FIG. 1A. FIG. 1F is a cross-sectional view of the composite lens 110 along a 1F-1F line in FIG. 1E. FIG. 1G is a partial enlarged view of the composite lens 110 according to the 1st embodiment in FIG. 1F. FIG. 1H is a partial cross section of the composite lens 110 according to the 1st embodiment in FIG. 1A. FIG. 1I is another partial cross section of the composite lens 110 according to the 1st embodiment in FIG. 1A. In FIGS. 1C to 1I, the optical portion 140 includes a first optical surface 141, a second optical surface 142 and a connecting surface 143, the optical axis X passes through the optical portion 140, the extending portion 150 is opaque, the extending portion 150 surrounds and covers the connecting surface 143, and the extending portion 150 and the optical portion 140 are integrally formed. A light L passes through the first optical surface 141 to enter the optical portion 140, the second optical surface 142 is corresponding to the first optical surface 141, the light L passes through the second optical surface 142 to exit the optical portion 140, and the connecting surface 143 surrounds the optical axis X and is connected to the first optical surface 141 and the second optical surface 142. It should be mentioned that the lines between the optical portion 140 and the extending portion 150 in FIG. 1C are only configured to indicate the ranges of the optical portion 140 and the extending portion 150, respectively.

In FIGS. 1D and 1E, the extending portion 150 includes four gate traces 151 axially and symmetrically disposed on the extending portion 150. Therefore, the manufacturing quality of the composite lens 110 can be improved by axially and symmetrically disposing the gate traces 151.

In FIGS. 1E and 1G to 1I, the extending portion 150 is attached to the optical portion 140 and extends towards a direction close to the optical axis X, a light through hole is formed on one of the first optical surface 141 and the second optical surface 142 via the extending portion 150, and another light through hole is formed on another one of the first optical surface 141 and the second optical surface 142 via the extending portion 150. According to the 1st embodiment, a first light through hole 161 and a second light through hole 162 are formed on the first optical surface 141 and the second optical surface 142 via the extending portion 150, respectively. Therefore, the optical portion 140 can be more stable by simultaneously covering the first optical surface 141 and the second optical surface 142 via the extending portion 150, and the stray light can be further reduced by disposing the first light through hole 161 and the second light through hole 162 on the first optical surface 141 and the second optical surface 142, respectively.

In FIGS. 1G to 1I, a contour of the light through hole is defined via an inner peripheral surface, and a contour of another light through hole is defined via another inner peripheral surface. According to the 1st embodiment, a contour of the first light through hole 161 is defined via a first inner peripheral surface 171, and a contour of the second light through hole 162 is defined via a second inner peripheral surface 172.

In FIGS. 1C, 1F and 1G, when a glass transition temperature of the optical portion 140 is TgO, and a glass transition temperature of the extending portion 150 is TgE; an angle between the first inner peripheral surface 171 and the second inner peripheral surface 172 is θt; an angle between the first inner peripheral surface 171 and the optical axis X is θa1, and an angle between the second inner peripheral surface 172 and the optical axis X is θa2; a contact angle is formed between the first inner peripheral surface 171 and the optical portion 140 on an edge of the first light through hole 161, and the contact angle is θb1; a contact angle is formed between the second inner peripheral surface 172 and the optical portion 140 on an edge of the second light through hole 162, and the contact angle is θb2; a diameter of the optical portion 140 is φO, a diameter of the light through hole (that is, the first light through hole 161) is φH, and a diameter of the lens element 121 is φL, the following conditions of Table 1 are satisfied.

TABLE 1

| 1st embodiment | | | |
|---|---|---|---|
| TgO (° C.) | 567 | θb2 (degrees) | 62 |
| TgE (° C.) | 147 | φO (mm) | 6.49 |
| TgO − TgE (° C.) | 420 | φH (mm) | 5.6 |
| θt (degrees) | 116 | φL (mm) | 6.89 |
| θa1 (degrees) | 35 | φO/φH | 1.16 |
| θa2 (degrees) | 29 | φL/φO | 1.06 |
| θb1 (degrees) | 73 | | |

2nd Embodiment

Figure 2A:
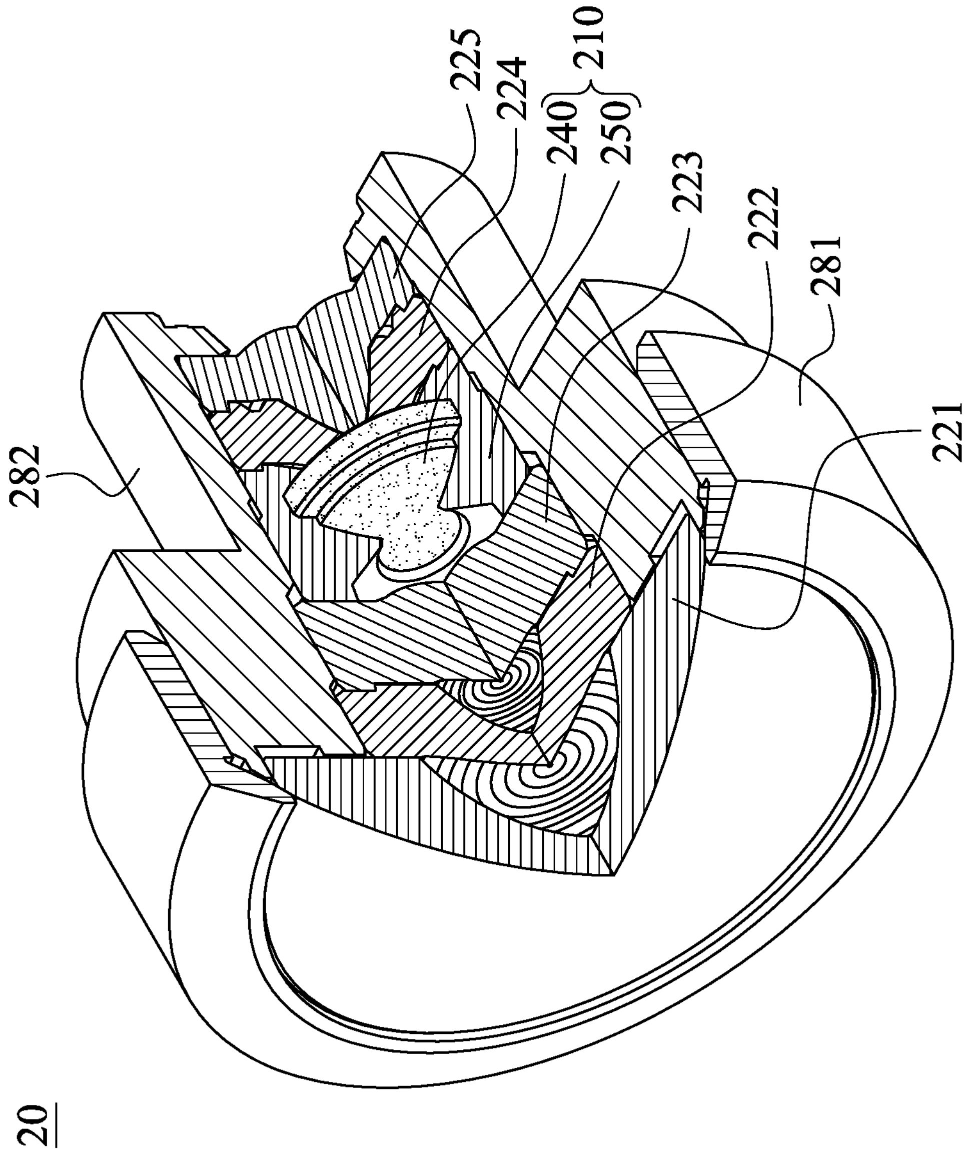
FIG. 2A is a partial cross section of an electronic device according to the 2nd embodiment of the present disclosure.
Figure 2B:
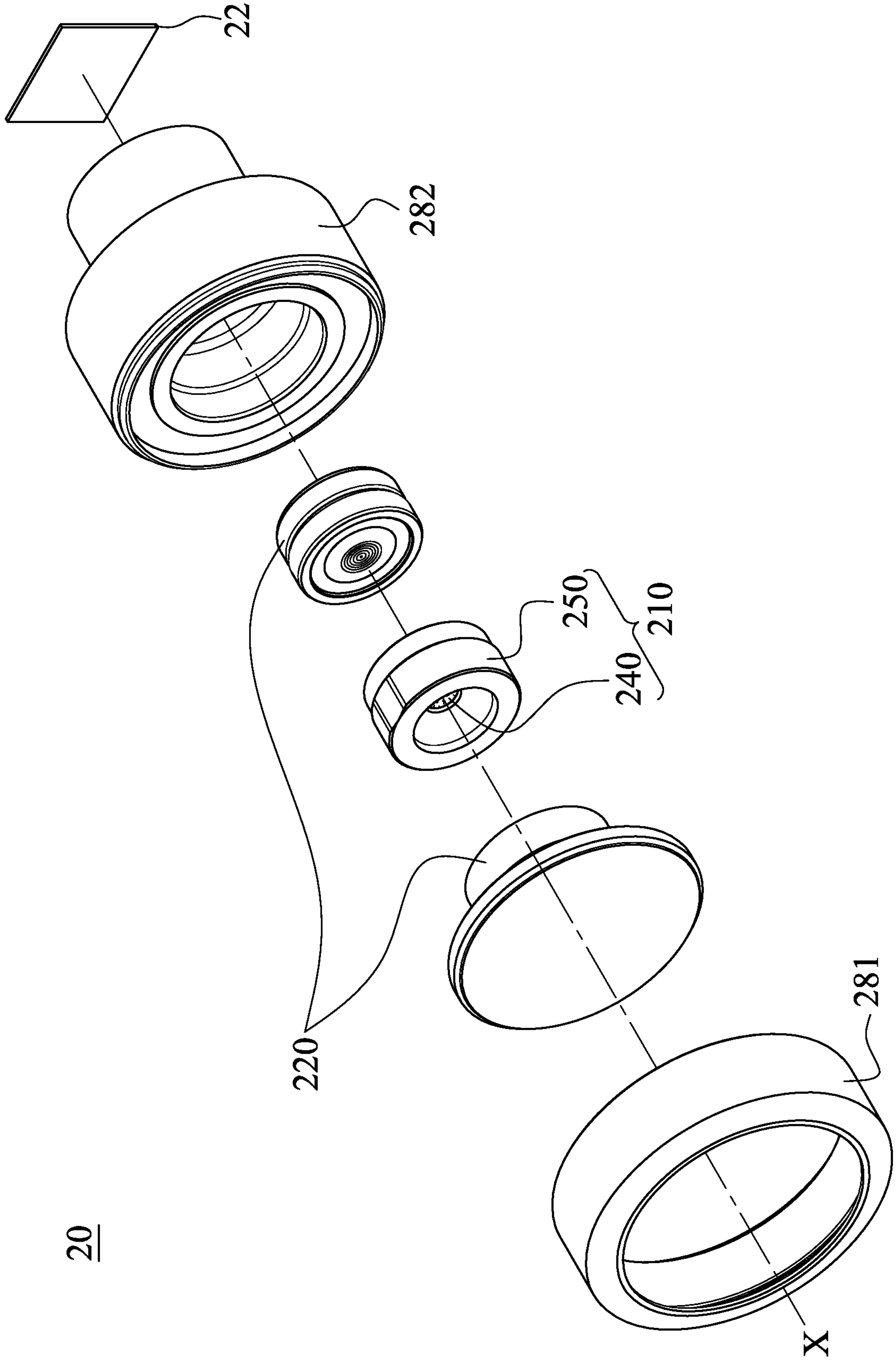
FIG. 2B is an exploded view of the electronic device according to the 2nd embodiment in FIG. 2A.
Figure 2C:
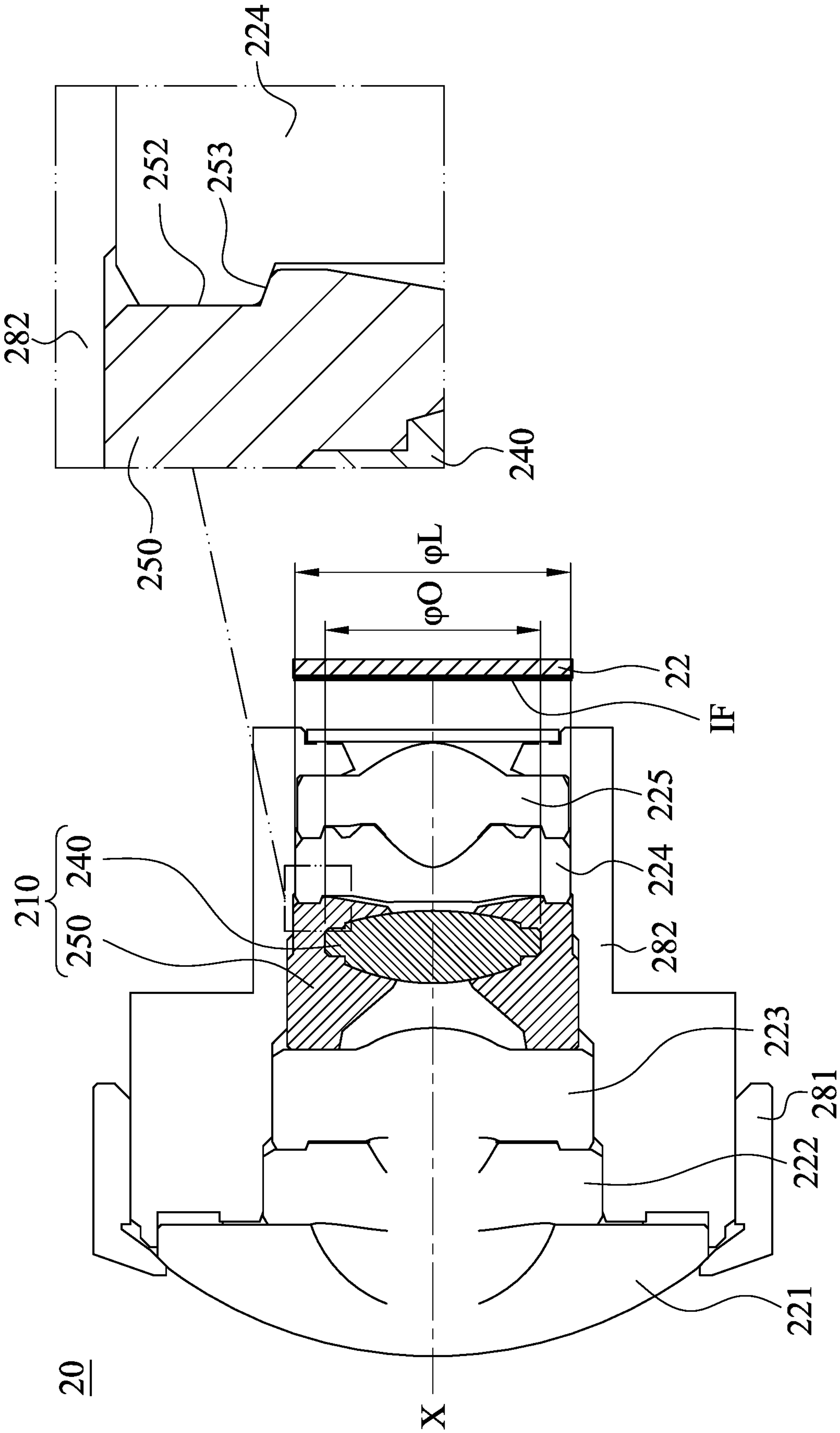
FIG. 2C is a cross-sectional view of the electronic device according to the 2nd embodiment in FIG. 2A.

FIG. 2A is a partial cross section of an electronic device 20 according to the 2nd embodiment of the present disclosure. FIG. 2B is an exploded view of the electronic device 20 according to the 2nd embodiment in FIG. 2A. FIG. 2C is a cross-sectional view of the electronic device 20 according to the 2nd embodiment in FIG. 2A. In FIGS. 2A to 2C, the electronic device 20 includes an optical lens (its reference numeral is omitted) and an image sensor 22, wherein the image sensor 22 is disposed on an image surface IF of the optical lens.

The optical lens includes a composite lens 210, a lens assembly 220, a retainer 281 and an accommodating element 282, wherein the lens assembly 220 includes a plurality of lens elements 221, 222, 223, 224, 225, the composite lens 210 includes an optical portion 240 and an extending portion 250, the accommodating element 282 is configured to accommodate the composite lens 210 and the lens assembly 220, and the retainer 281 is disposed on an object side of the lens element 221. Furthermore, the optical portion 240 of the composite lens 210 is disposed on an object side of the lens element 224, and the lens element 224 is adjacently disposed with the composite lens 210 along an optical axis X. In particular, the assembling error can be reduced via the composite lens 210.

In detail, the optical portion 240 can be made of glass material, and the extending portion 250 can be made of plastic material, wherein the optical portion 240 can further be a molded glass or a ground glass, but the present disclosure is not limited thereto. Therefore, the optical portion 240 made of glass material is favorable for enhancing the environmental tolerance of the optical lens, and the plastic material is easier to process than the glass material to process, so that the extending portion 250 made of plastic material is favorable for enhancing the design freedom of the optical lens.

Figure 2D:
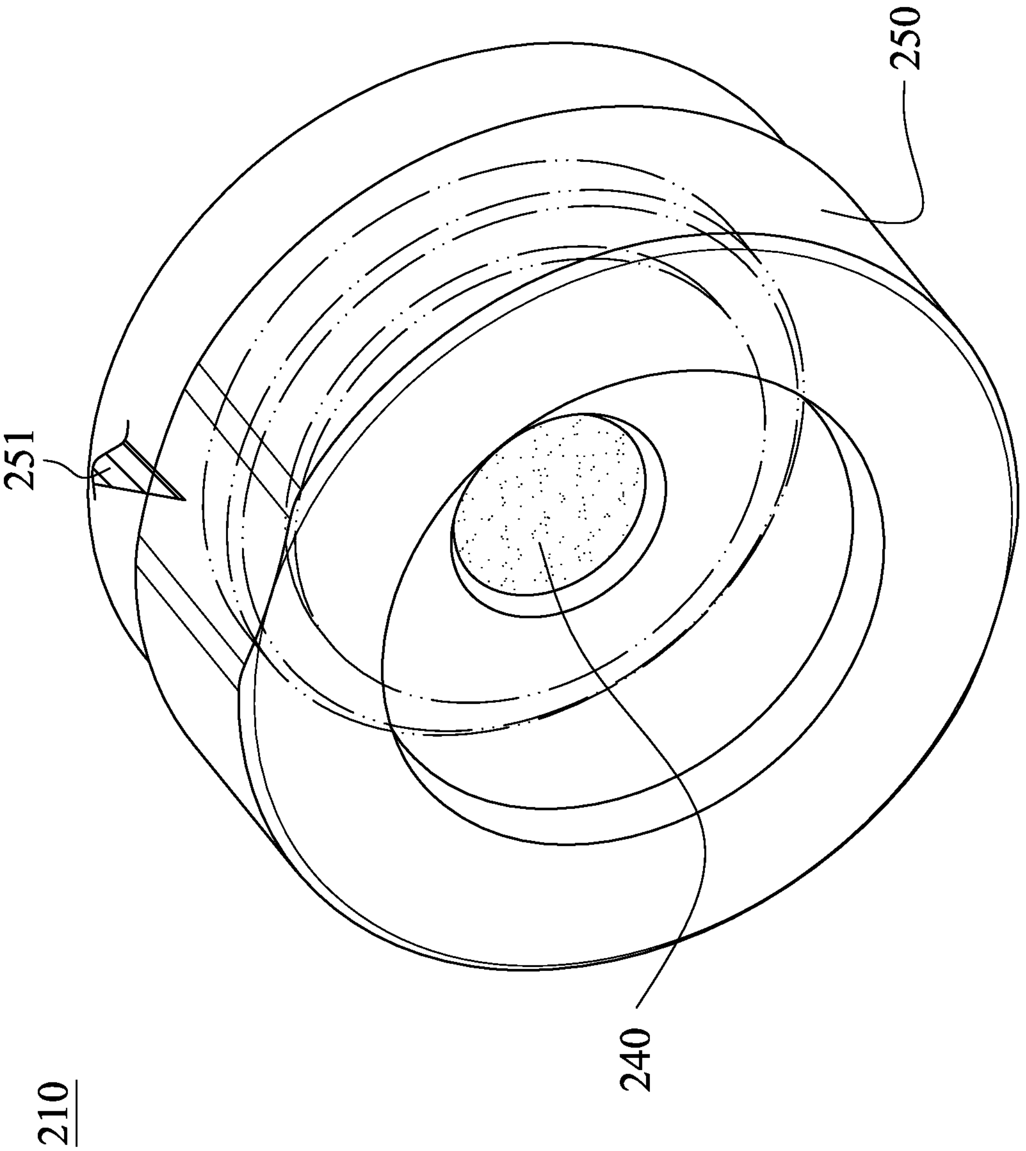
FIG. 2D is a three-dimensional perspective view of the composite lens according to the 2nd embodiment in FIG. 2A.
Figure 2E:
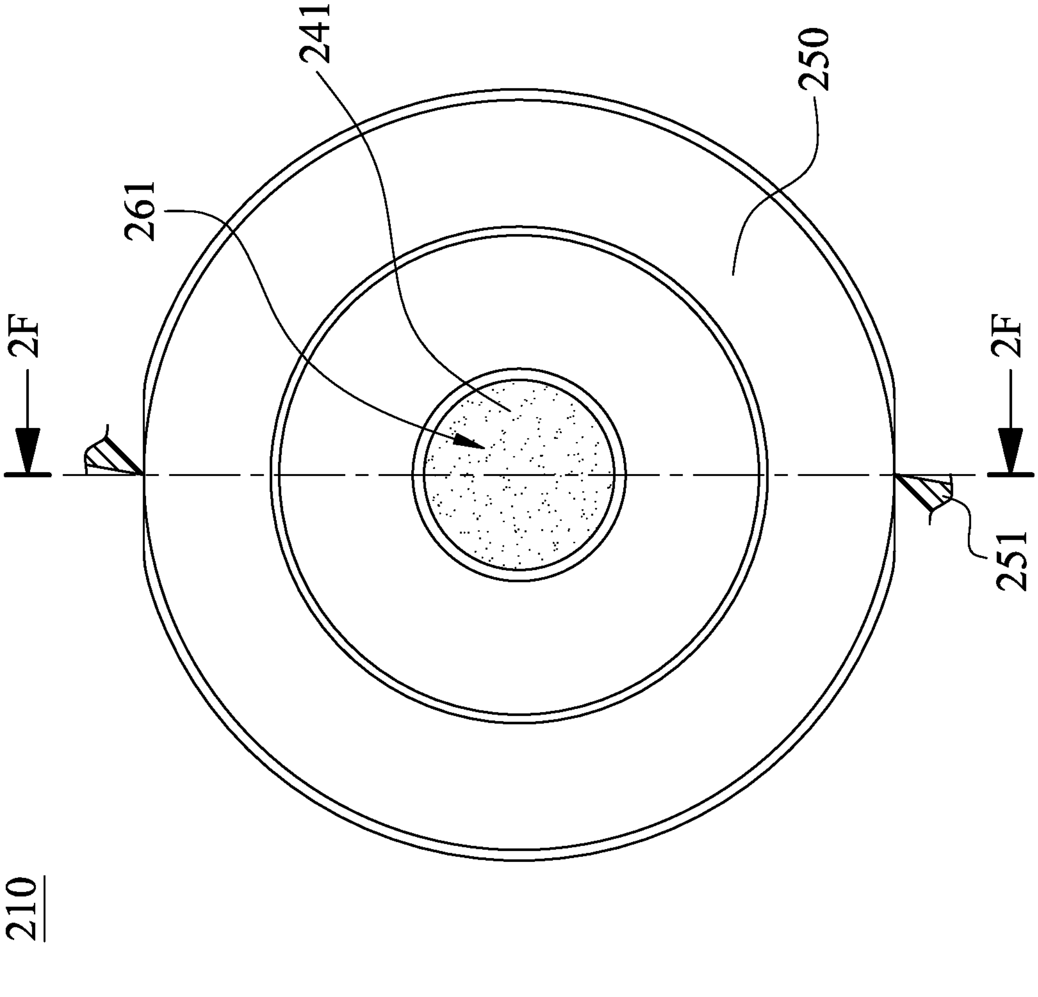
FIG. 2E is a top view of the composite lens according to the 2nd embodiment in FIG. 2A.
Figure 2F:
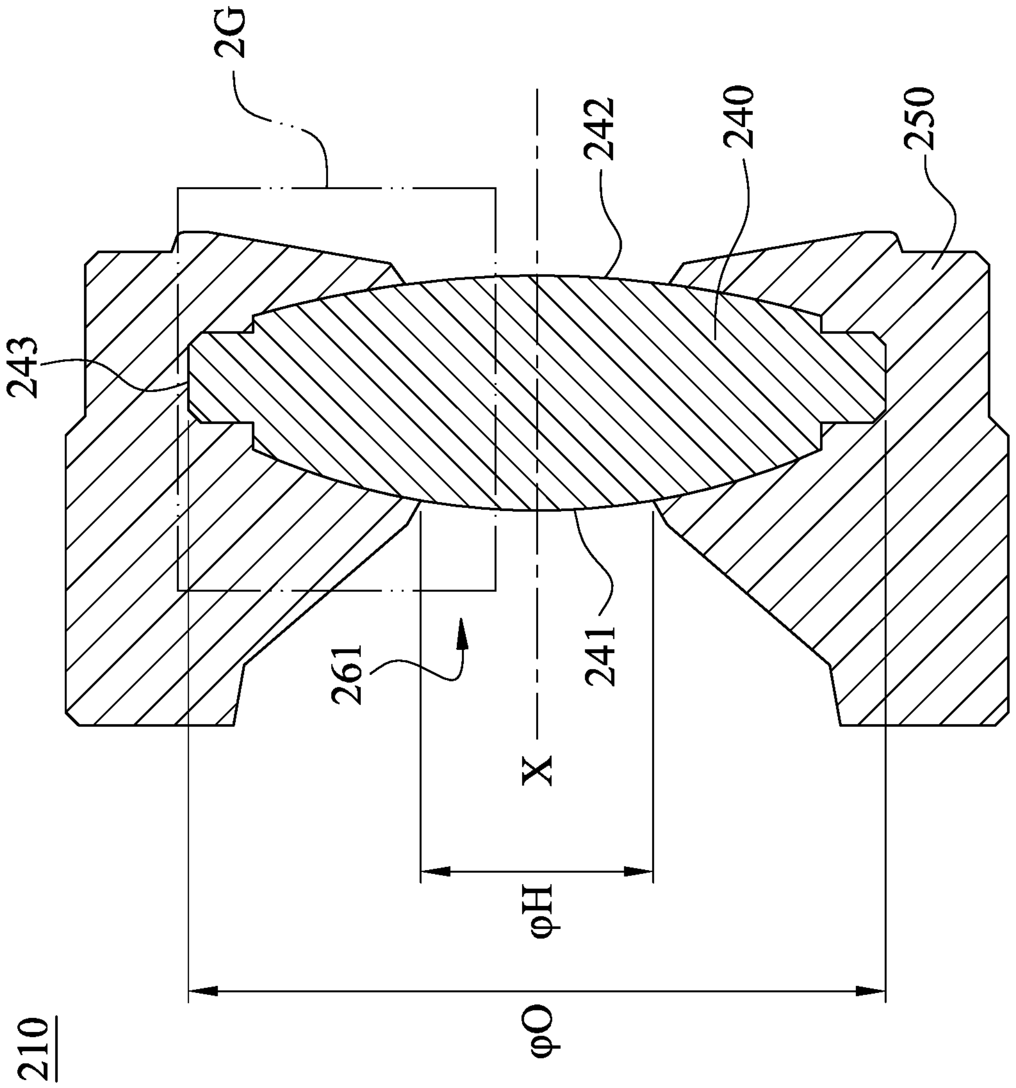
FIG. 2F is a cross-sectional view of the composite lens along a 2F-2F line in FIG. 2E.
Figure 2G:
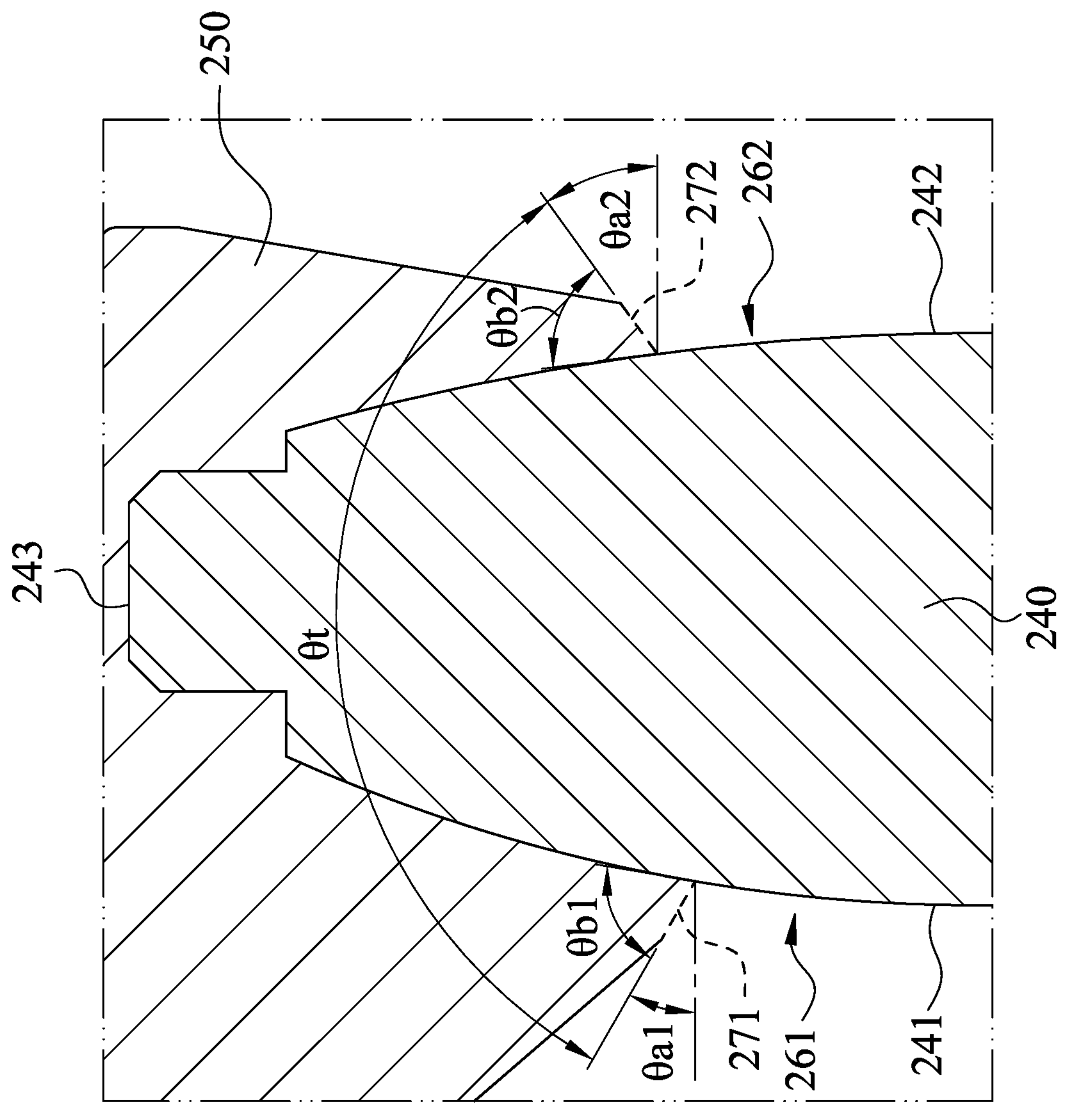
FIG. 2G is a partial enlarged view of the composite lens according to the 2nd embodiment in FIG. 2F.
Figure 2H:
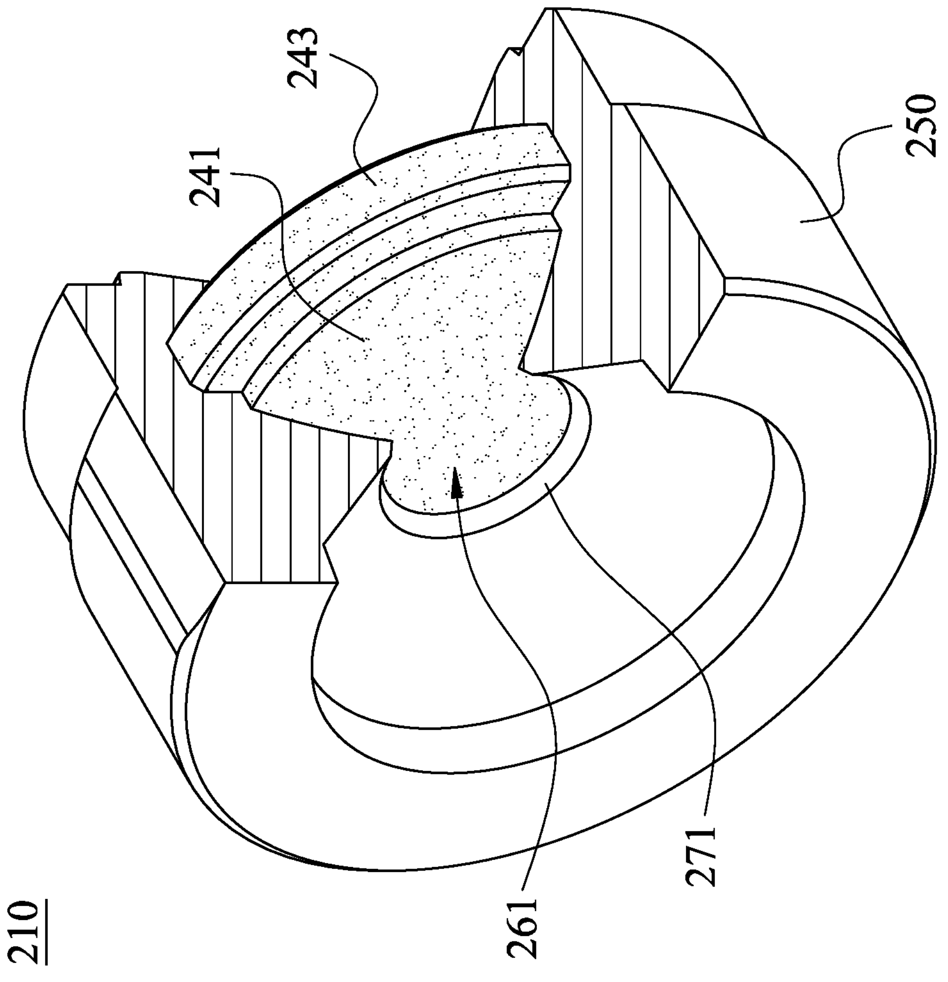
FIG. 2H is a partial cross section of the composite lens according to the 1st example of the 2nd embodiment in FIG. 2A.
Figure 2I:
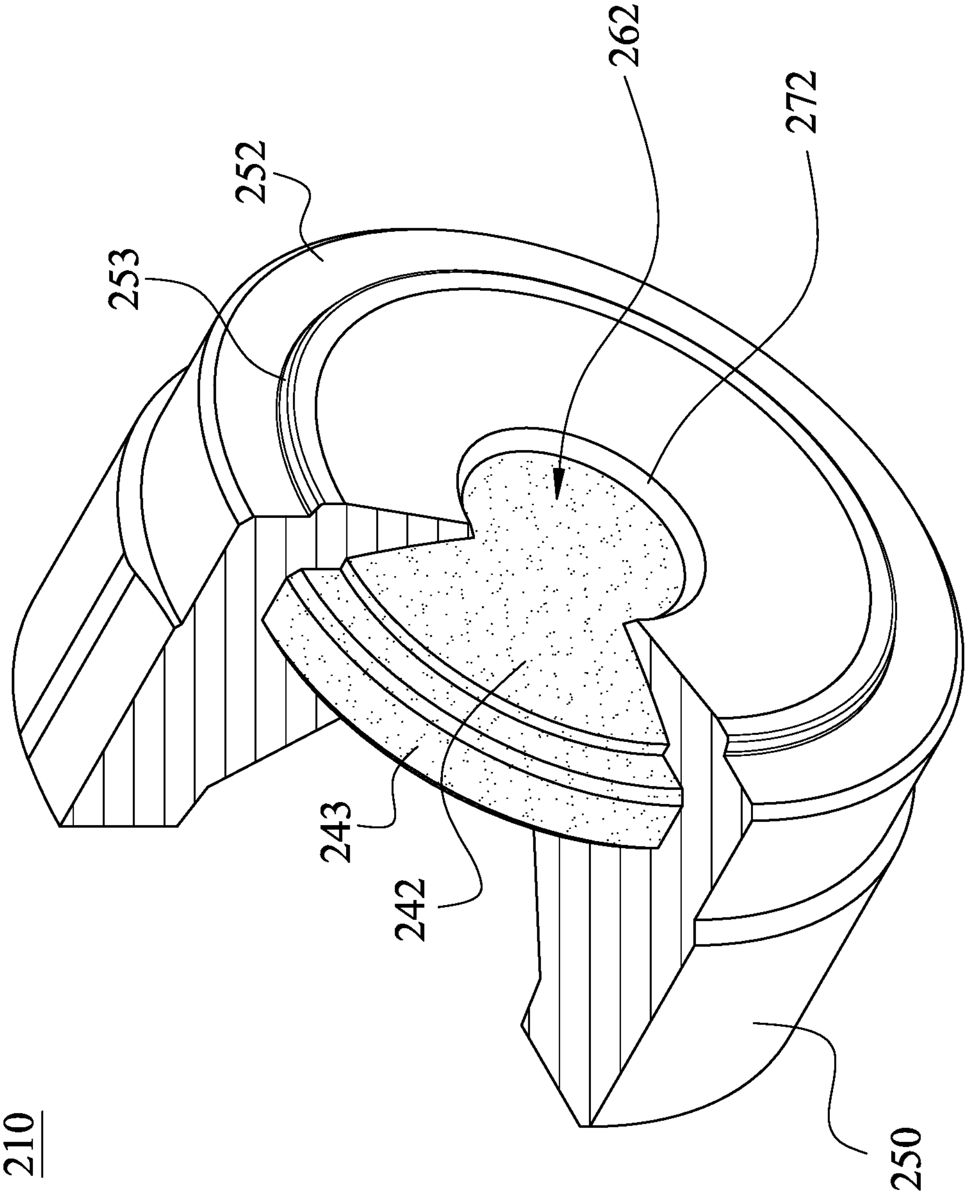
FIG. 2I is another partial cross section of the composite lens according to the 1st example of the 2nd embodiment in FIG. 2A.

FIG. 2D is a three-dimensional perspective view of the composite lens 210 according to the 2nd embodiment in FIG. 2A. FIG. 2E is a top view of the composite lens 210 according to the 2nd embodiment in FIG. 2A. FIG. 2F is a cross-sectional view of the composite lens 210 along a 2F-2F line in FIG. 2E. FIG. 2G is a partial enlarged view of the composite lens 210 according to the 2nd embodiment in FIG. 2F. FIG. 2H is a partial cross section of the composite lens 210 according to the 1st example of the 2nd embodiment in FIG. 2A. FIG. 2I is another partial cross section of the composite lens 210 according to the 1st example of the 2nd embodiment in FIG. 2A. In FIGS. 2D to 2I, the optical portion 240 includes a first optical surface 241, a second optical surface 242 and a connecting surface 243, the optical axis X passes through the optical portion 240, the extending portion 250 is opaque, the extending portion 250 surrounds and covers the connecting surface 243, and the extending portion 250 and the optical portion 240 are integrally formed. A light (not shown) passes through the first optical surface 241 to enter the optical portion 240, the second optical surface 242 is corresponding to the first optical surface 241, the light passes through the second optical surface 242 to exit the optical portion 240, and the connecting surface 243 surrounds the optical axis X and is connected to the first optical surface 241 and the second optical surface 242. It should be mentioned that the lines between the optical portion 240 and the extending portion 250 in FIG. 2C are only configured to indicate the ranges of the optical portion 240 and the extending portion 250, respectively.

In FIGS. 2D and 2E, the extending portion 250 includes two gate traces 251 axially and symmetrically disposed on the extending portion 250. Therefore, the manufacturing quality of the composite lens 210 can be improved by axially and symmetrically disposing the gate traces 251.

In FIGS. 2E and 2G to 2I, the extending portion 250 is attached to the optical portion 240 and extends towards a direction close to the optical axis X, a light through hole is formed on one of the first optical surface 241 and the second optical surface 242 via the extending portion 250, and another light through hole is formed on another one of the first optical surface 241 and the second optical surface 242 via the extending portion 250. According to the 2nd embodiment, a first light through hole 261 and a second light through hole 262 are formed on the first optical surface 241 and the second optical surface 242 via the extending portion 250, respectively. Therefore, the optical portion 240 can be more stable by simultaneously covering the first optical surface 241 and the second optical surface 242 via the extending portion 250, and the stray light can be further reduced by disposing the first light through hole 261 and the second light through hole 262 on the first optical surface 241 and the second optical surface 242, respectively.

In FIGS. 2G to 2I, a contour of the light through hole is defined via an inner peripheral surface, and a contour of another light through hole is defined via another inner peripheral surface. According to the 2nd embodiment, a contour of the first light through hole 261 is defined via a first inner peripheral surface 271, and a contour of the second light through hole 262 is defined via a second inner peripheral surface 272.

In FIGS. 2C and 2I, the extending portion 250 can have a plane 252 and a frustum surface 253, wherein the plane 252 and the frustum surface 253 are physically contacted with the lens element 224. Hence, the extending portion 250 can have the embedded function via the plane 252 and the frustum surface 253, so that the composite lens 210 and the lens element 224 are assembled and positioned.

In FIG. 2F, both of the first optical surface 241 and the second optical surface 242 can be convex surfaces, so that the volume of the optical lens can be reduced.

In FIGS. 2C, 2F and 2G, when an angle between the first inner peripheral surface 271 and the second inner peripheral surface 272 is θt; an angle between the first inner peripheral surface 271 and the optical axis X is θa1, and an angle between the second inner peripheral surface 272 and the optical axis X is θa2; a contact angle is formed between the first inner peripheral surface 271 and the optical portion 240 on an edge of the first light through hole 261, and the contact angle is θb1; a contact angle is formed between the second inner peripheral surface 272 and the optical portion 240 on an edge of the second light through hole 262, and the contact angle is θb2; a diameter of the optical portion 240 is φO, a diameter of the light through hole (that is, the first light through hole 261) is φH, and a diameter of the lens element 224 is φL, the following conditions of Table 2 are satisfied.

TABLE 2

| 2nd embodiment | | | |
|---|---|---|---|
| θt (degrees) | 114 | φO (mm) | 5.4 |
| θa1 (degrees) | 30 | φH (mm) | 1.8 |
| θa2 (degrees) | 36 | φL (mm) | 6.9 |
| θb1 (degrees) | 70 | φO/φH | 3 |
| θb2 (degrees) | 62 | φL/φO | 1.28 |

Figure 2J:
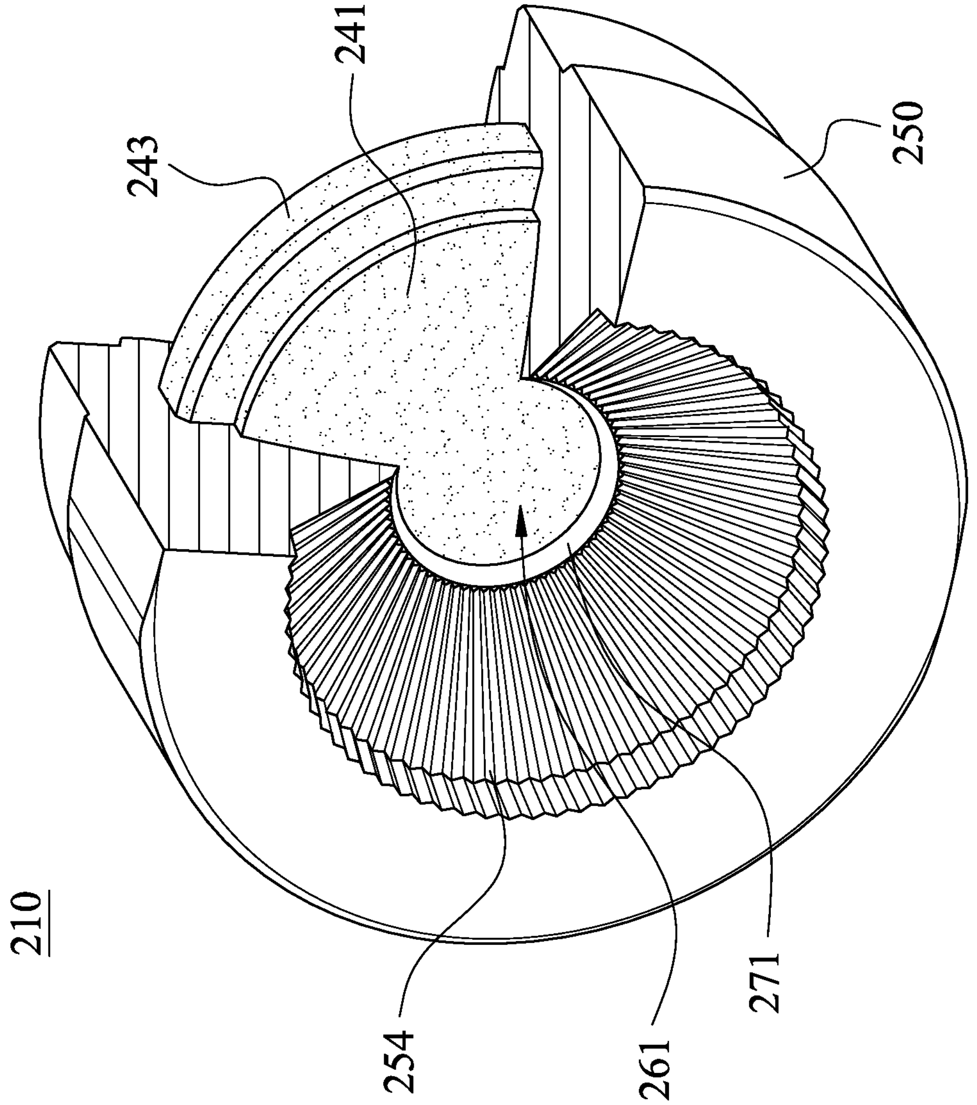
FIG. 2J is a partial cross section of the composite lens according to the 2nd example of the 2nd embodiment in FIG. 2A.

FIG. 2J is a partial cross section of the composite lens 210 according to the 2nd example of the 2nd embodiment in FIG. 2A. In FIG. 2J, the extending portion 250 can further include a light diminishing structure 254, wherein a surface contour of the extending portion 250 is undulating via the light diminishing structure 254. Therefore, the reflection of the stray light can be reduced. Moreover, the light diminishing structure 254 can be triangular columnar radially disposed with the optical axis X as the center.

Figure 2K:
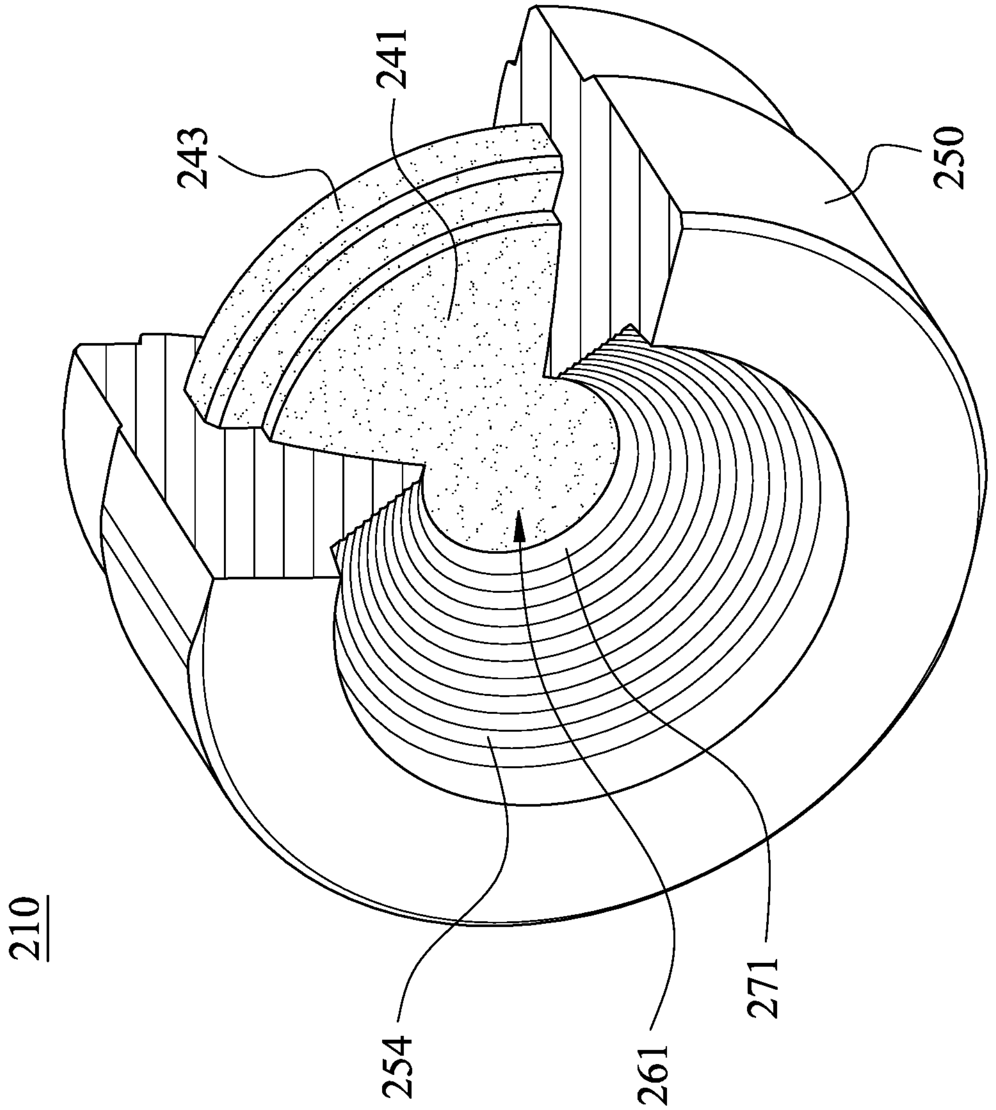
FIG. 2K is a partial cross section of the composite lens according to the 3rd example of the 2nd embodiment in FIG. 2A.

FIG. 2K is a partial cross section of the composite lens 210 according to the 3rd example of the 2nd embodiment in FIG. 2A. In FIG. 2K, the light diminishing structure 254 can be cylindrical disposed in concentric circle with the optical axis X as the center.

3rd Embodiment

Figure 3A:
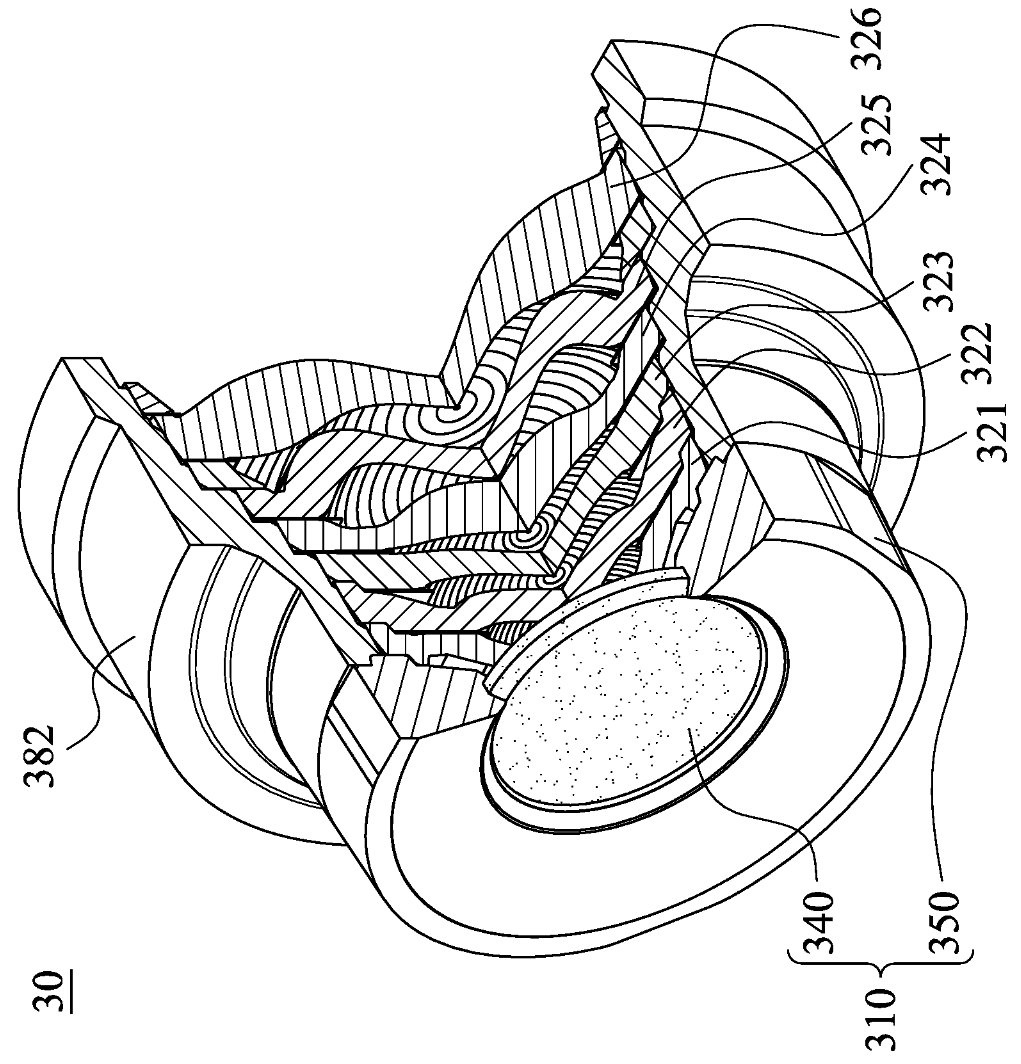
FIG. 3A is a partial cross section of an electronic device according to the 3rd embodiment of the present disclosure.
Figure 3B:
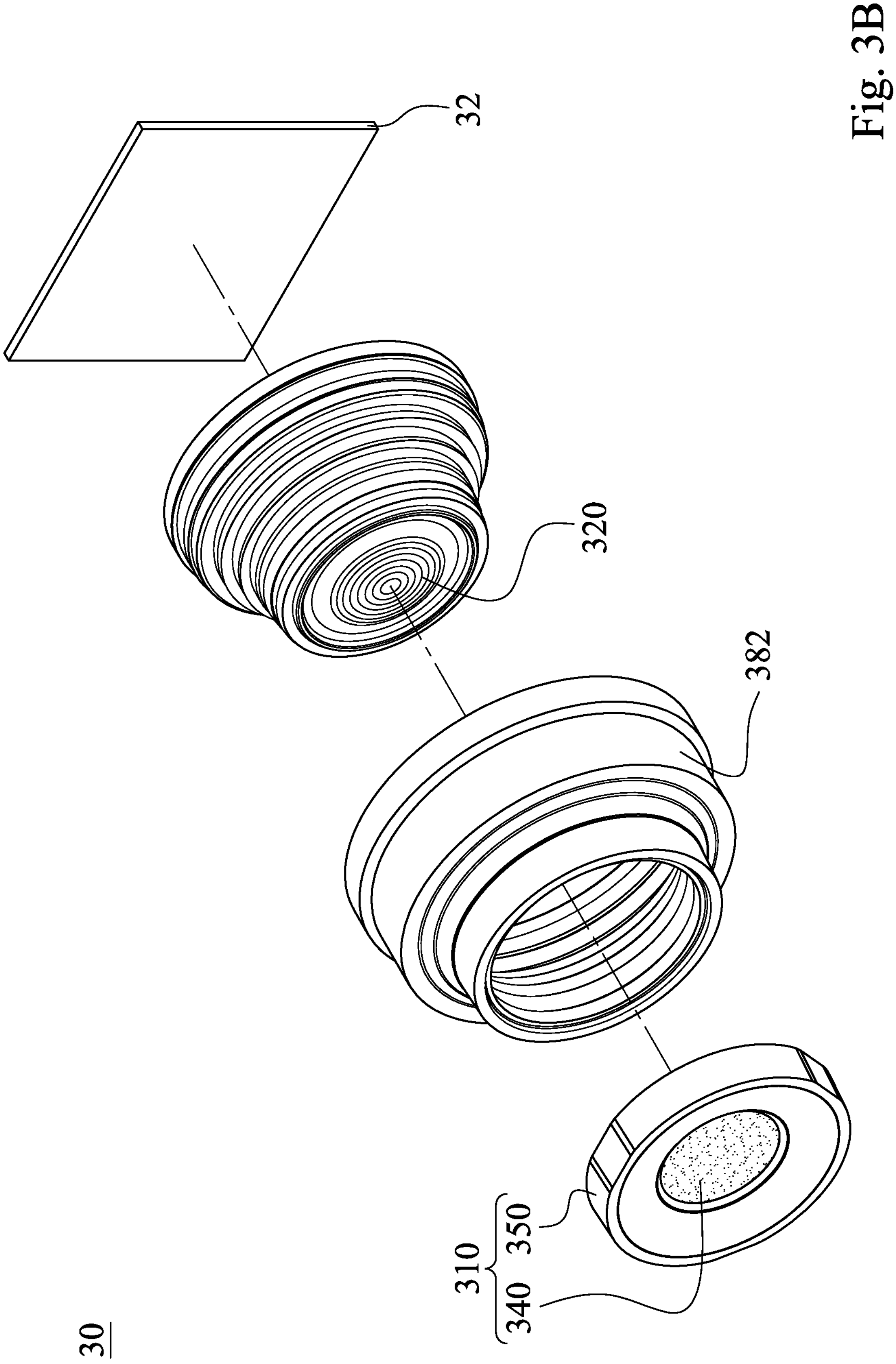
FIG. 3B is an exploded view of the electronic device according to the 3rd embodiment in FIG. 3A.
Figure 3C:
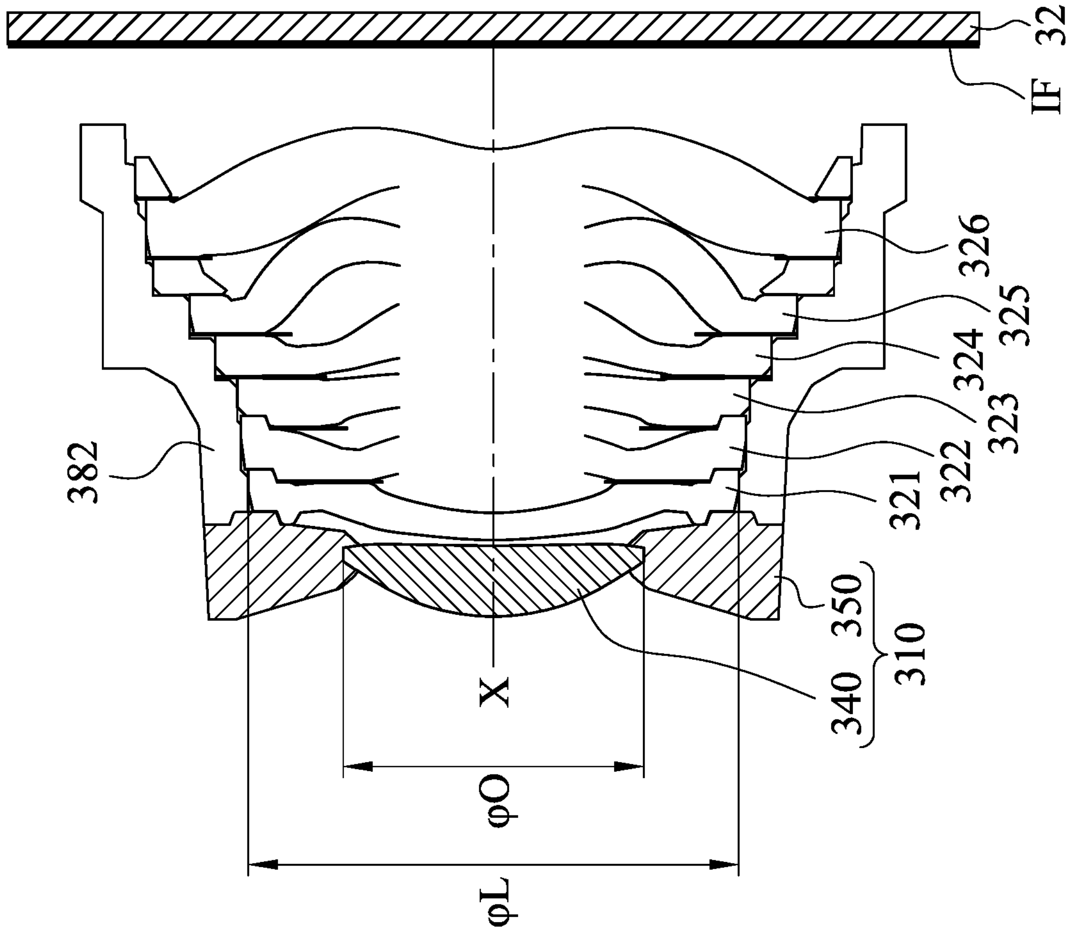
FIG. 3C is a cross-sectional view of the electronic device according to the 3rd embodiment in FIG. 3A.

FIG. 3A is a partial cross section of an electronic device 30 according to the 3rd embodiment of the present disclosure. FIG. 3B is an exploded view of the electronic device 30 according to the 3rd embodiment in FIG. 3A. FIG. 3C is a cross-sectional view of the electronic device 30 according to the 3rd embodiment in FIG. 3A. In FIGS. 3A to 3C, the electronic device 30 includes an optical lens (its reference numeral is omitted) and an image sensor 32, wherein the image sensor 32 is disposed on an image surface IF of the optical lens.

The optical lens includes a composite lens 310, a lens assembly 320 and an accommodating element 382, wherein the lens assembly 320 includes a plurality of lens elements 321, 322, 323, 324, 325, 326, the composite lens 310 includes an optical portion 340 and an extending portion 350, and the accommodating element 382 is configured to accommodate the lens assembly 320. Furthermore, the optical portion 340 of the composite lens 310 is disposed on an object side of the lens element 321, and the lens element 321 is adjacently disposed with the composite lens 310 along an optical axis X. In particular, the assembling error can be reduced via the composite lens 310.

In detail, the optical portion 340 can be made of glass material, and the extending portion 350 can be made of plastic material, wherein the optical portion 340 can further be a molded glass or a ground glass, but the present disclosure is not limited thereto. Therefore, the optical portion 340 made of glass material is favorable for enhancing the environmental tolerance of the optical lens, and the plastic material is easier to process than the glass material to process, so that the extending portion 350 made of plastic material is favorable for enhancing the design freedom of the optical lens.

Figure 3D:
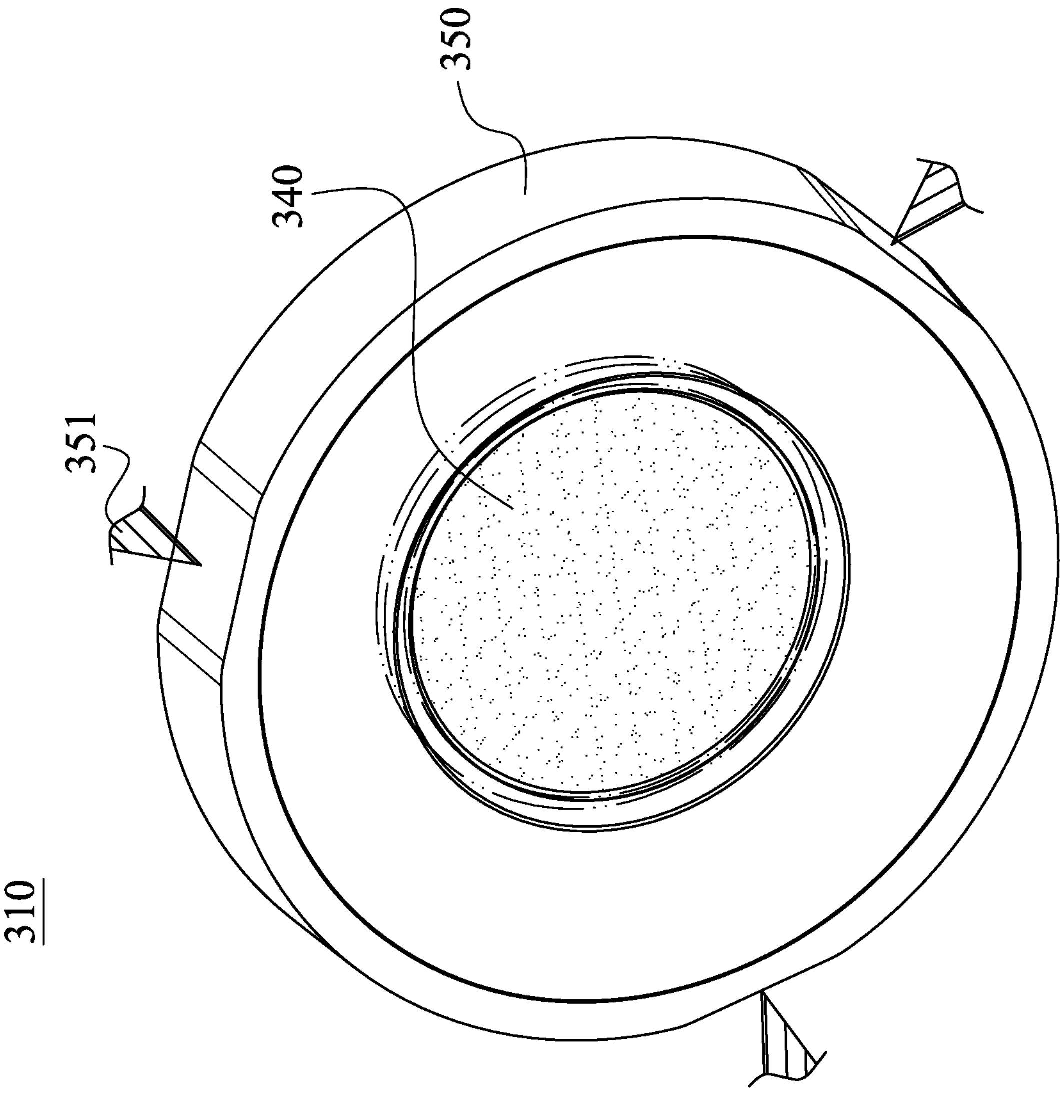
FIG. 3D is a three-dimensional perspective view of the composite lens according to the 3rd embodiment in FIG. 3A.
Figure 3E:
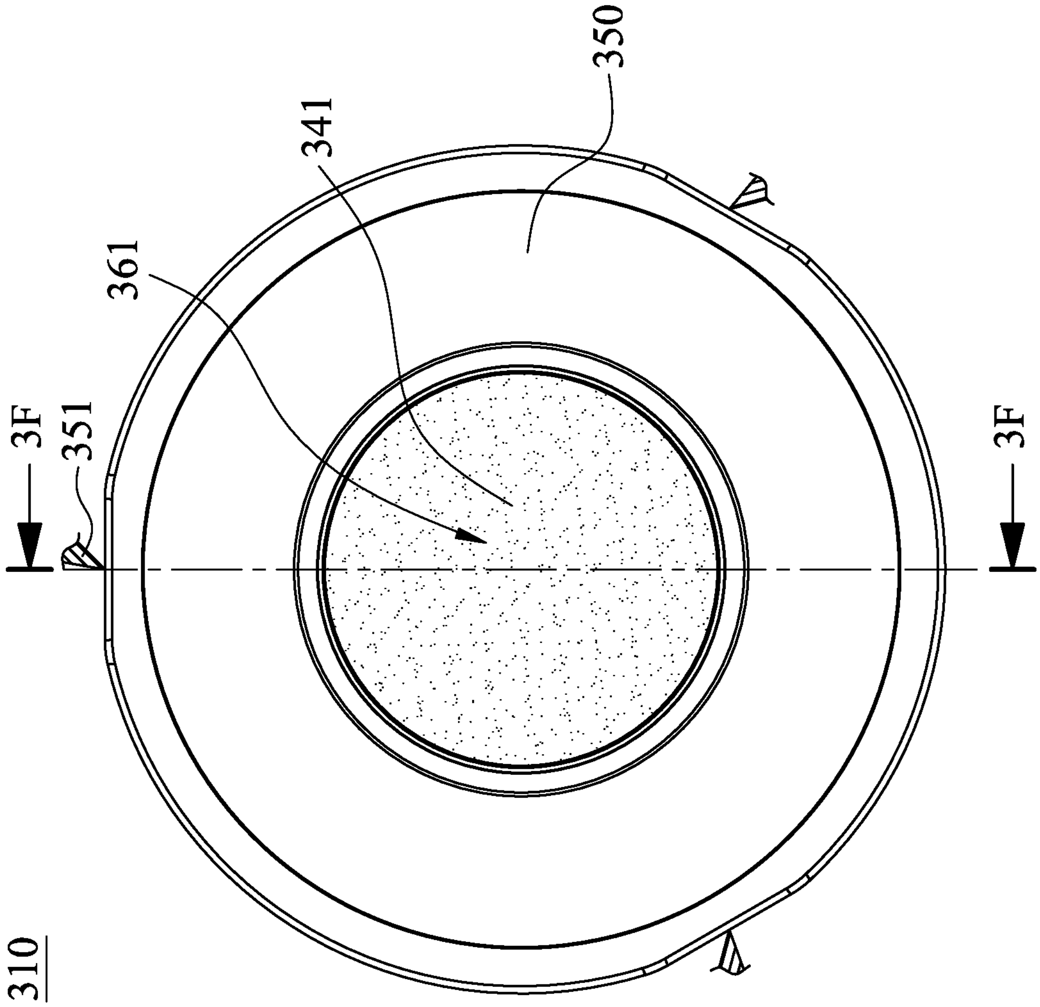
FIG. 3E is a top view of the composite lens according to the 3rd embodiment in FIG. 3A.
Figure 3F:
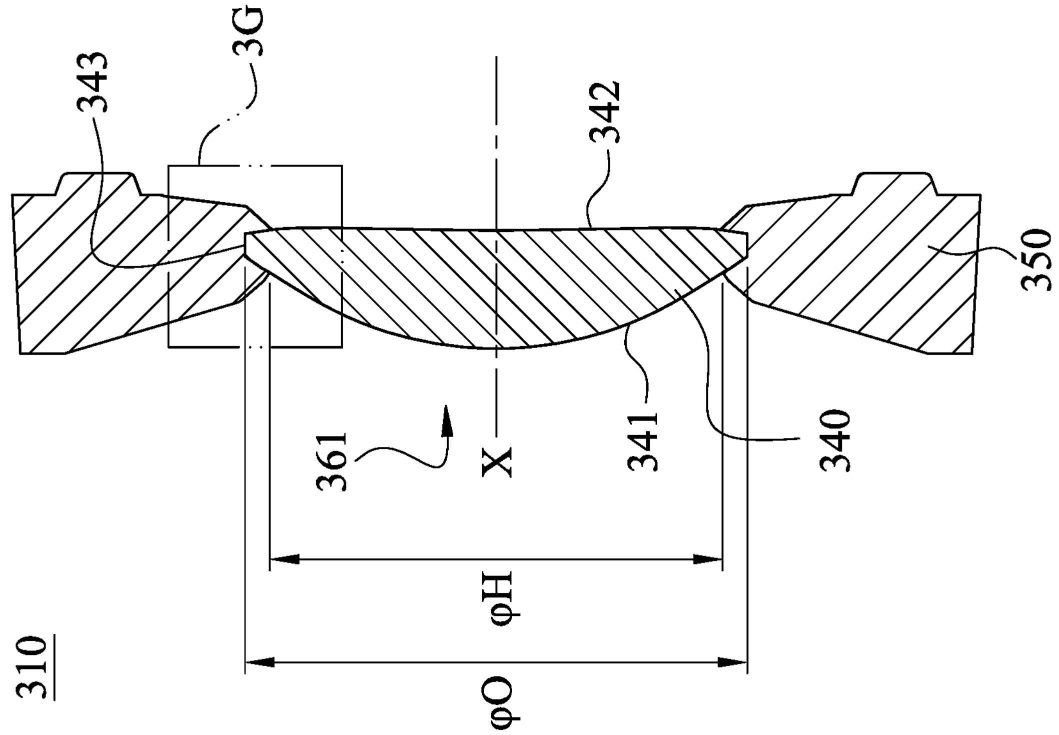
FIG. 3F is a cross-sectional view of the composite lens along a 3F-3F line in FIG. 3E.
Figure 3G:
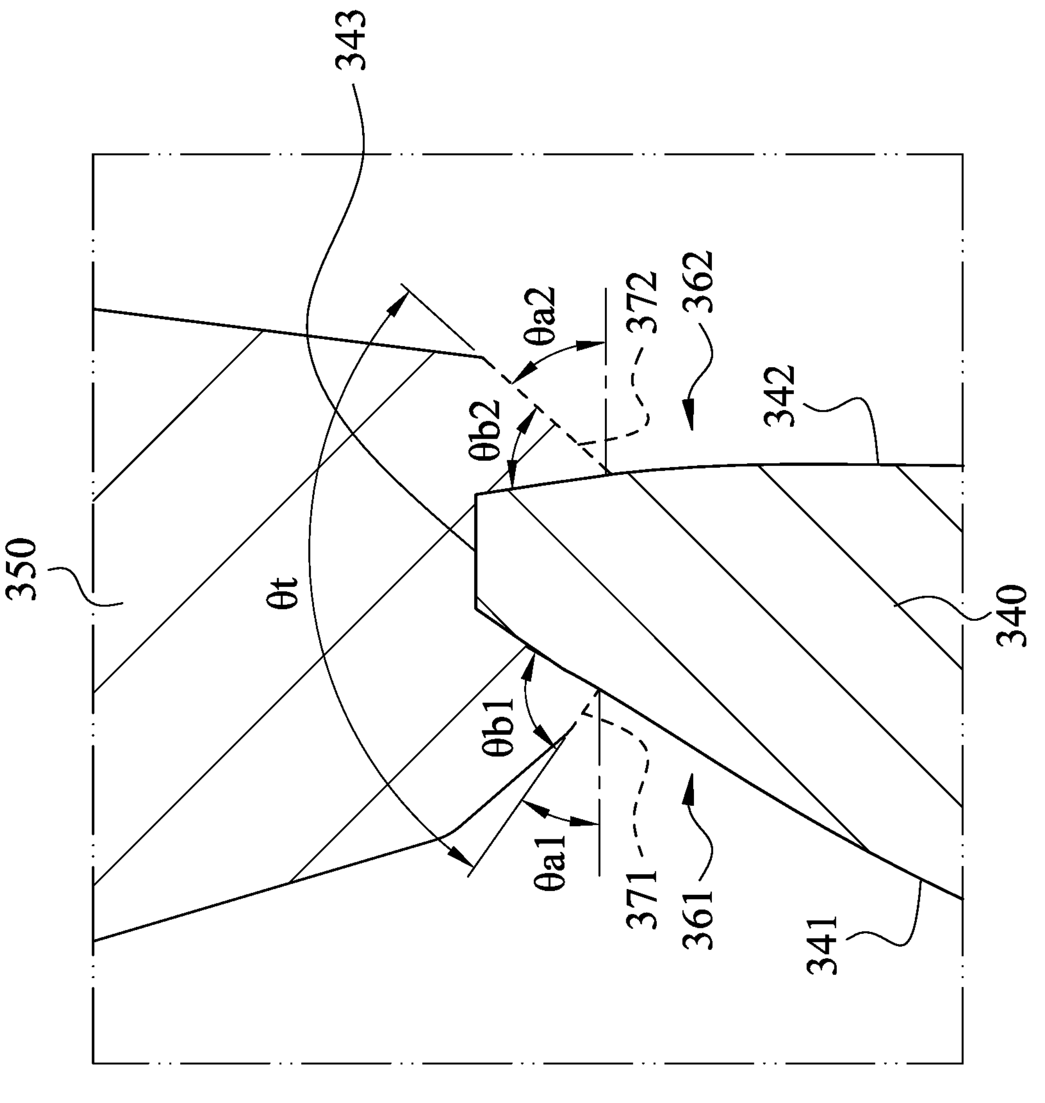
FIG. 3G is a partial enlarged view of the composite lens according to the 3rd embodiment in FIG. 3F.
Figure 3H:
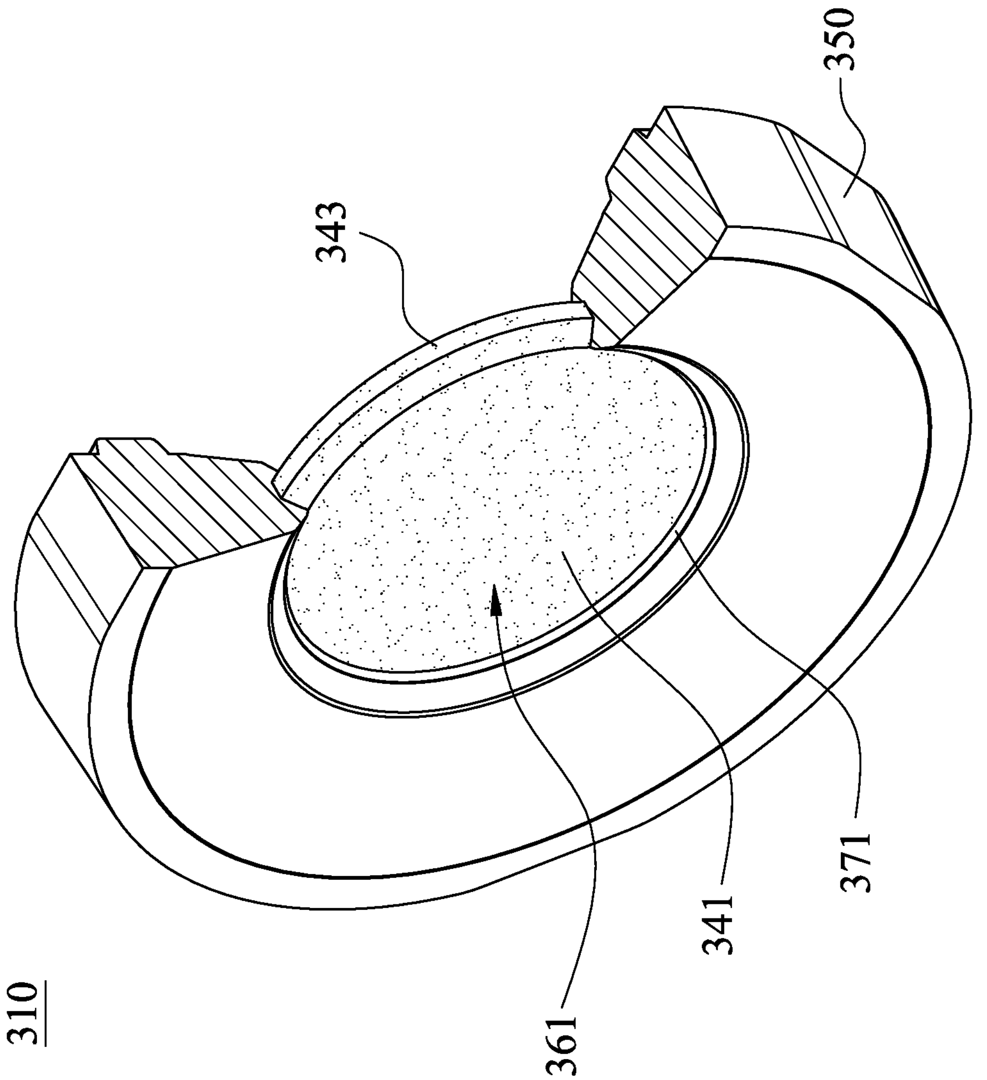
FIG. 3H is a partial cross section of the composite lens according to the 3rd embodiment in FIG. 3A.
Figure 3I:
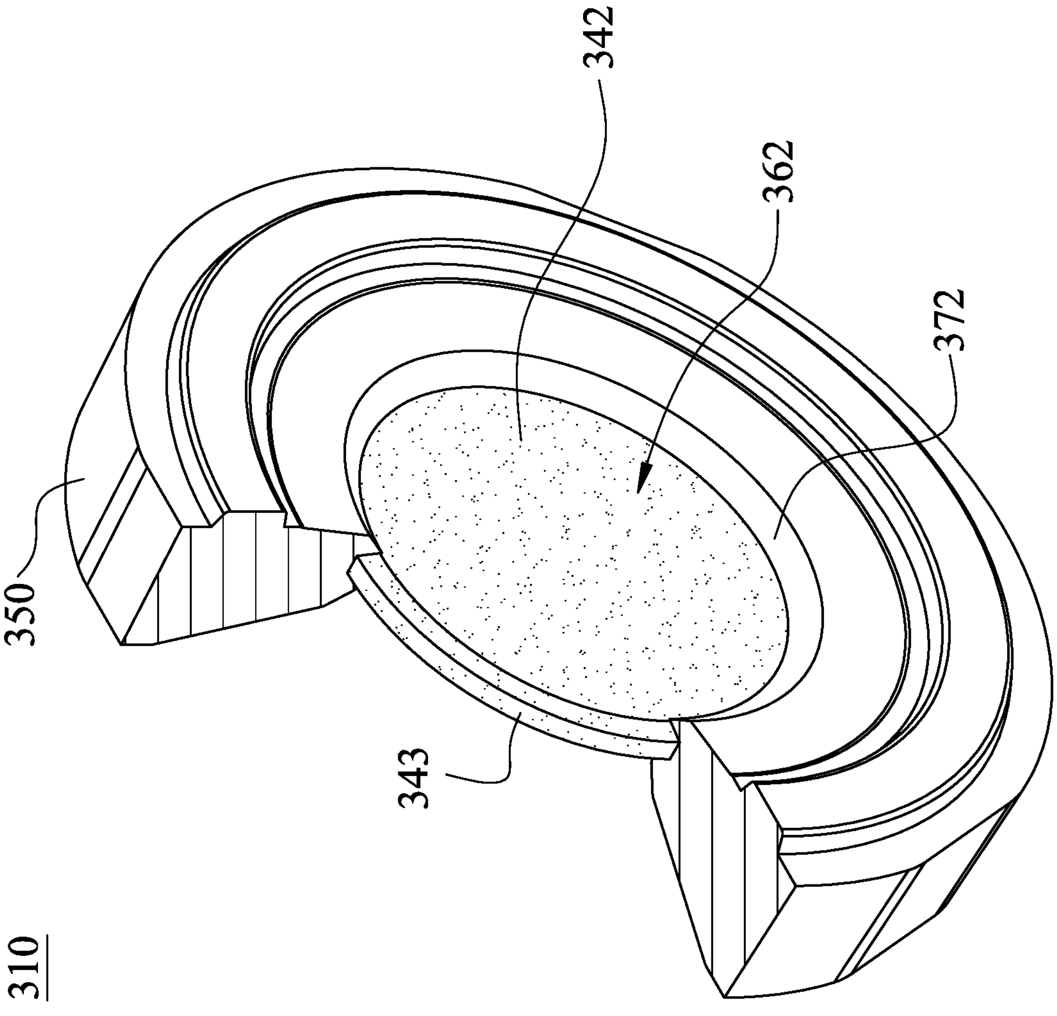
FIG. 3I is another partial cross section of the composite lens according to the 3rd embodiment in FIG. 3A.

FIG. 3D is a three-dimensional perspective view of the composite lens 310 according to the 3rd embodiment in FIG. 3A. FIG. 3E is a top view of the composite lens 310 according to the 3rd embodiment in FIG. 3A. FIG. 3F is a cross-sectional view of the composite lens 310 along a 3F-3F line in FIG. 3E. FIG. 3G is a partial enlarged view of the composite lens 310 according to the 3rd embodiment in FIG. 3F. FIG. 3H is a partial cross section of the composite lens 310 according to the 3rd embodiment in FIG. 3A. FIG. 3I is another partial cross section of the composite lens 310 according to the 3rd embodiment in FIG. 3A. In FIGS. 3D to 3I, the optical portion 340 includes a first optical surface 341, a second optical surface 342 and a connecting surface 343, the optical axis X passes through the optical portion 340, the extending portion 350 is opaque, the extending portion 350 surrounds and covers the connecting surface 343, and the extending portion 350 and the optical portion 340 are integrally formed. A light (not shown) passes through the first optical surface 341 to enter the optical portion 340, the second optical surface 342 is corresponding to the first optical surface 341, the light passes through the second optical surface 342 to exit the optical portion 340, and the connecting surface 343 surrounds the optical axis X and is connected to the first optical surface 341 and the second optical surface 342. It should be mentioned that the lines between the optical portion 340 and the extending portion 350 in FIG. 3C are only configured to indicate the ranges of the optical portion 340 and the extending portion 350, respectively.

In FIGS. 3D and 3E, the extending portion 350 includes three gate traces 351 axially and symmetrically disposed on the extending portion 350. Therefore, the manufacturing quality of the composite lens 310 can be improved by axially and symmetrically disposing the gate traces 351.

In FIGS. 3E and 3G to 3I, the extending portion 350 is attached to the optical portion 340 and extends towards a direction close to the optical axis X, a light through hole is formed on one of the first optical surface 341 and the second optical surface 342 via the extending portion 350, and another light through hole is formed on another one of the first optical surface 341 and the second optical surface 342 via the extending portion 350. According to the 3rd embodiment, a first light through hole 361 and a second light through hole 362 are formed on the first optical surface 341 and the second optical surface 342 via the extending portion 350, respectively. Therefore, the optical portion 340 can be more stable by simultaneously covering the first optical surface 341 and the second optical surface 342 via the extending portion 350, and the stray light can be further reduced by disposing the first light through hole 361 and the second light through hole 362 on the first optical surface 341 and the second optical surface 342, respectively.

In FIGS. 3G to 3I, a contour of the light through hole is defined via an inner peripheral surface, and a contour of the another light through hole is defined via another inner peripheral surface. According to the 3rd embodiment, a contour of the first light through hole 361 is defined via a first inner peripheral surface 371, and a contour of the second light through hole 362 is defined via a second inner peripheral surface 372.

In FIGS. 3C, 3F and 3G, when an angle between the first inner peripheral surface 371 and the second inner peripheral surface 372 is θt; an angle between the first inner peripheral surface 371 and the optical axis X is θa1, and an angle between the second inner peripheral surface 372 and the optical axis X is θa2; a contact angle is formed between the first inner peripheral surface 371 and the optical portion 340 on an edge of the first light through hole 361, and the contact angle is θb1; a contact angle is formed between the second inner peripheral surface 372 and the optical portion 340 on an edge of the second light through hole 362, and the contact angle is θb2; a diameter of the optical portion 340 is φO, a diameter of the light through hole (that is, the first light through hole 361) is φH, and a diameter of the lens element 321 is φL, the following conditions of Table 3 are satisfied.

TABLE 3

| 3rd embodiment | | | |
|---|---|---|---|
| θt (degrees) | 97 | φO (mm) | 4.11 |
| θa1 (degrees) | 35 | φH (mm) | 3.7 |
| θa2 (degrees) | 48 | φL (mm) | 6.7 |
| θb1 (degrees) | 85 | φO/φH | 1.11 |
| θb2 (degrees) | 51 | φL/φO | 1.63 |

4th Embodiment

Figure 4A:
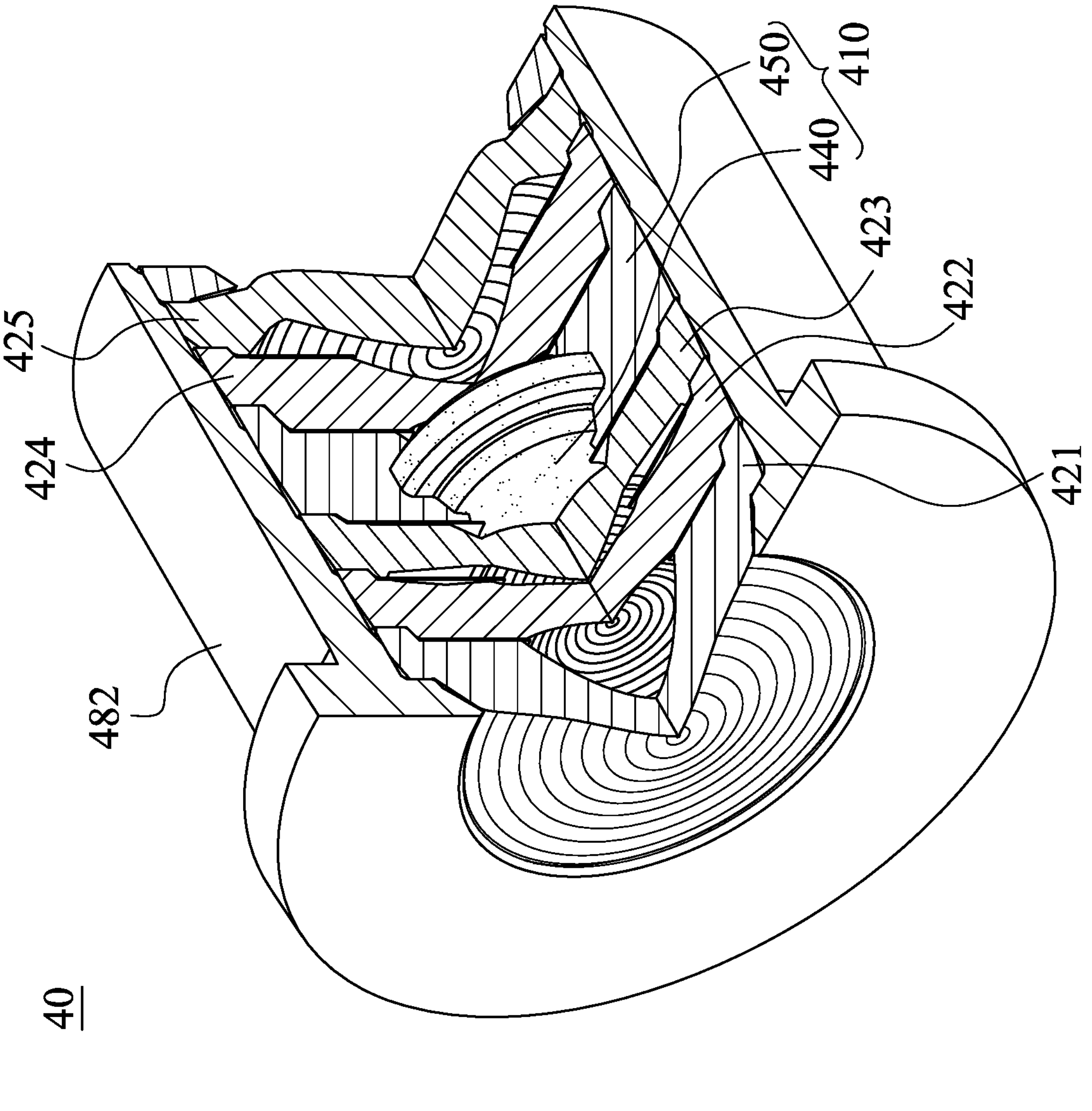
FIG. 4A is a partial cross section of an electronic device according to the 4th embodiment of the present disclosure.
Figure 4B:
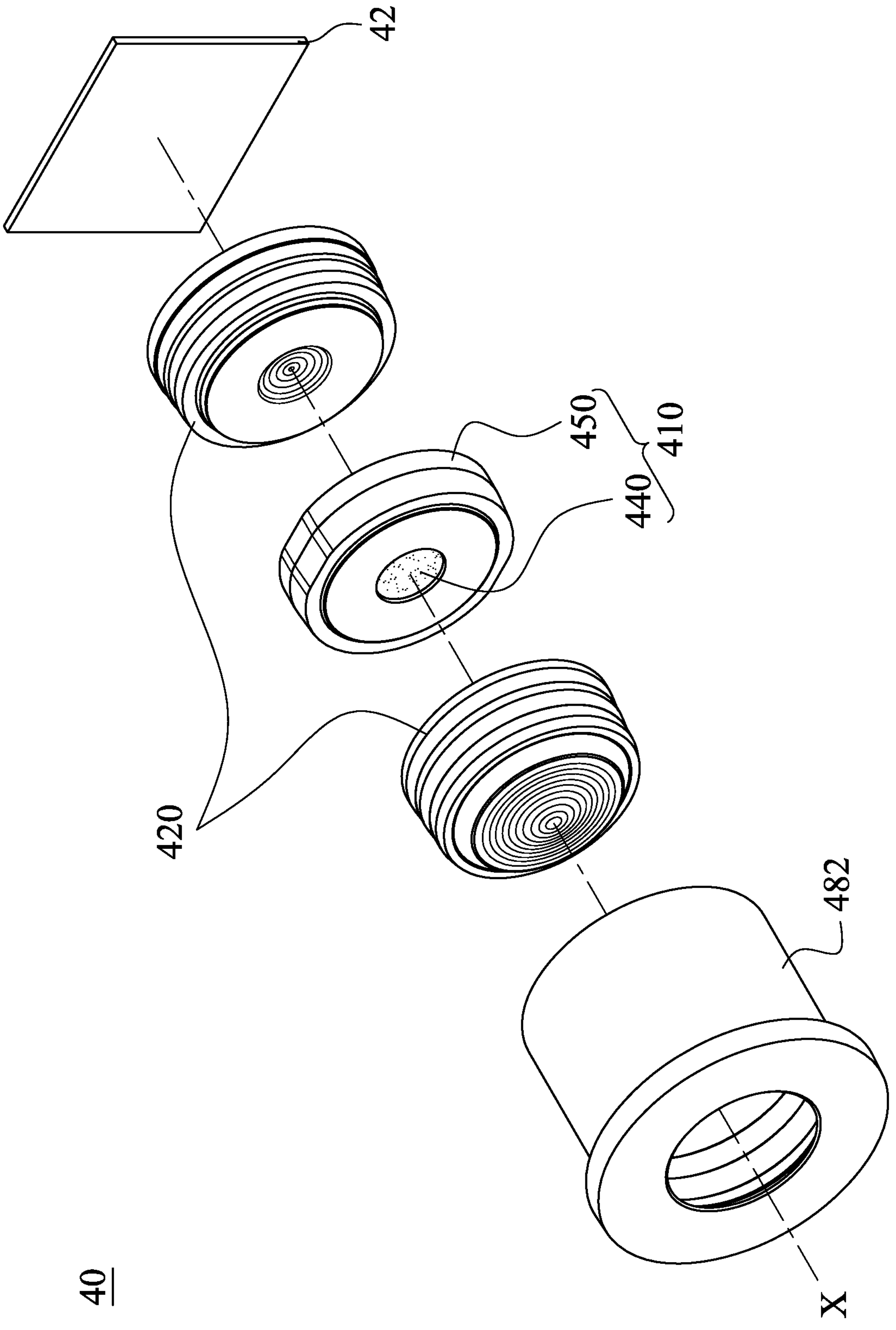
FIG. 4B is an exploded view of the electronic device according to the 4th embodiment in FIG. 4A.
Figure 4C:
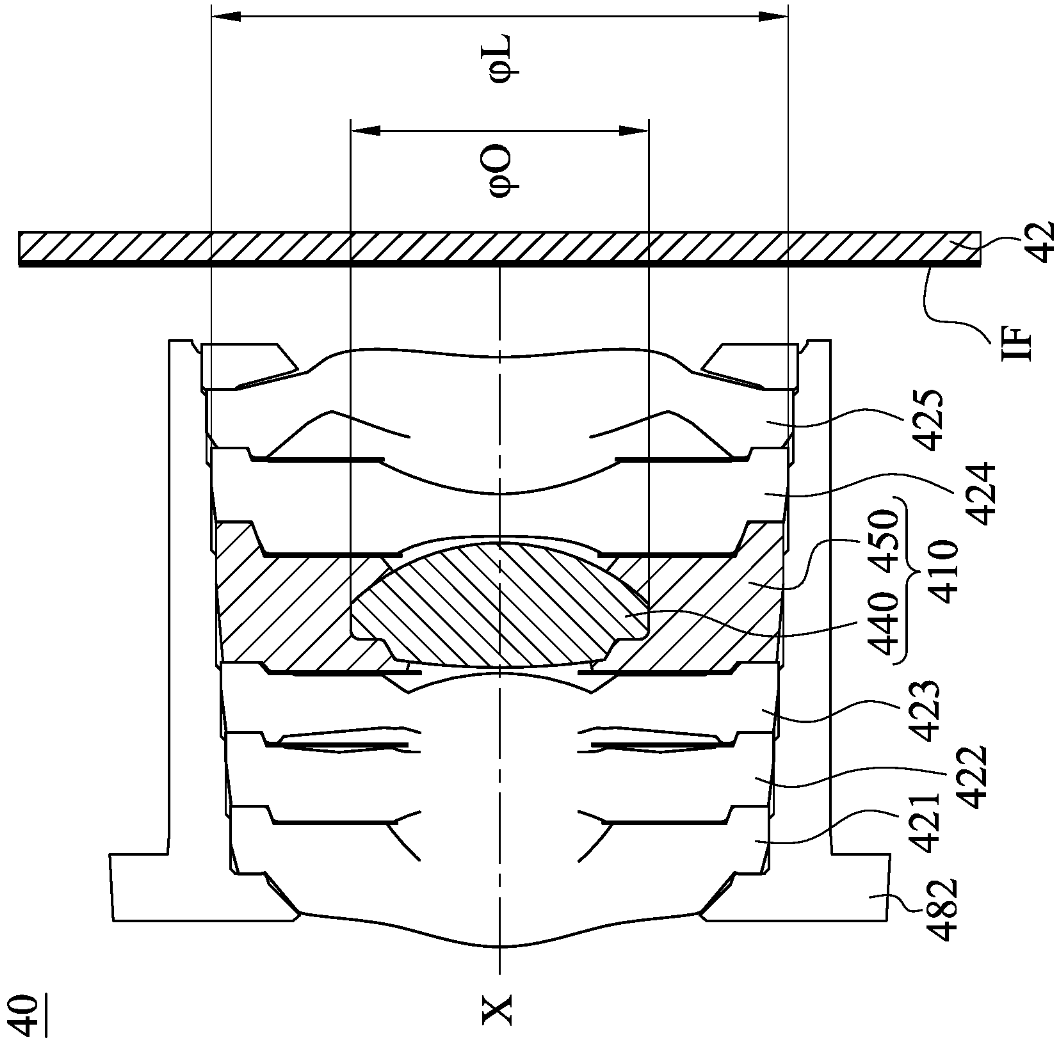
FIG. 4C is a cross-sectional view of the electronic device according to the 4th embodiment in FIG. 4A.

FIG. 4A is a partial cross section of an electronic device 40 according to the 4th embodiment of the present disclosure. FIG. 4B is an exploded view of the electronic device 40 according to the 4th embodiment in FIG. 4A. FIG. 4C is a cross-sectional view of the electronic device 40 according to the 4th embodiment in FIG. 4A. In FIGS. 4A to 4C, the electronic device 40 includes an optical lens (its reference numeral is omitted) and an image sensor 42, wherein the image sensor 42 is disposed on an image surface IF of the optical lens.

The optical lens includes a composite lens 410, a lens assembly 420 and an accommodating element 482, wherein the lens assembly 420 includes a plurality of lens elements 421, 422, 423, 424, 425, the composite lens 410 includes an optical portion 440 and an extending portion 450, and the accommodating element 482 is configured to accommodate the composite lens 410 and the lens assembly 420. Furthermore, the optical portion 440 of the composite lens 410 is disposed on an object side of the lens element 424, and the lens element 424 is adjacently disposed with the composite lens 410 along an optical axis X. In particular, the assembling error can be reduced via the composite lens 410.

In detail, the optical portion 440 can be made of glass material, and the extending portion 450 can be made of plastic material, wherein the optical portion 440 can further be a molded glass or a ground glass, but the present disclosure is not limited thereto. Therefore, the optical portion 440 made of glass material is favorable for enhancing the environmental tolerance of the optical lens, and the plastic material is easier to process than the glass material to process, so that the extending portion 450 made of plastic material is favorable for enhancing the design freedom of the optical lens.

Figure 4D:
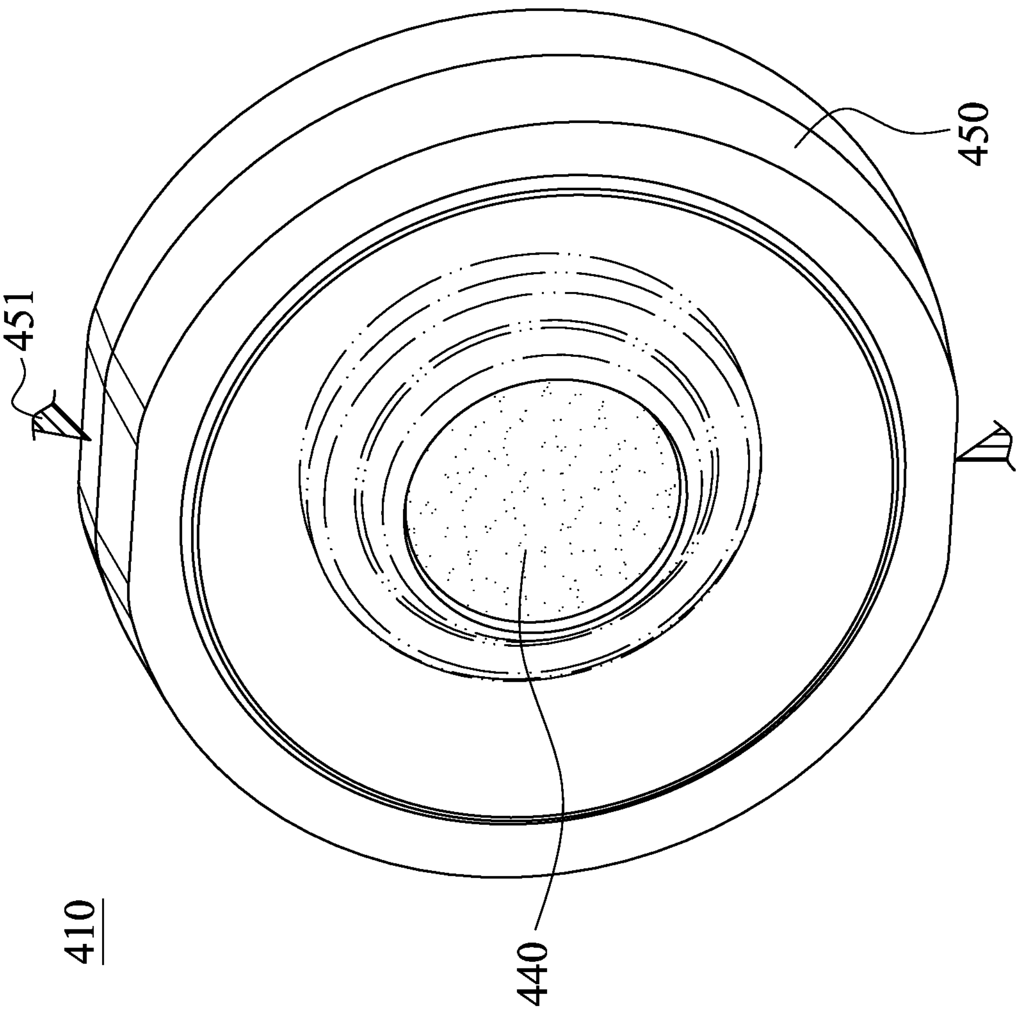
FIG. 4D is a three-dimensional perspective view of the composite lens according to the 4th embodiment in FIG. 4A.
Figure 4E:
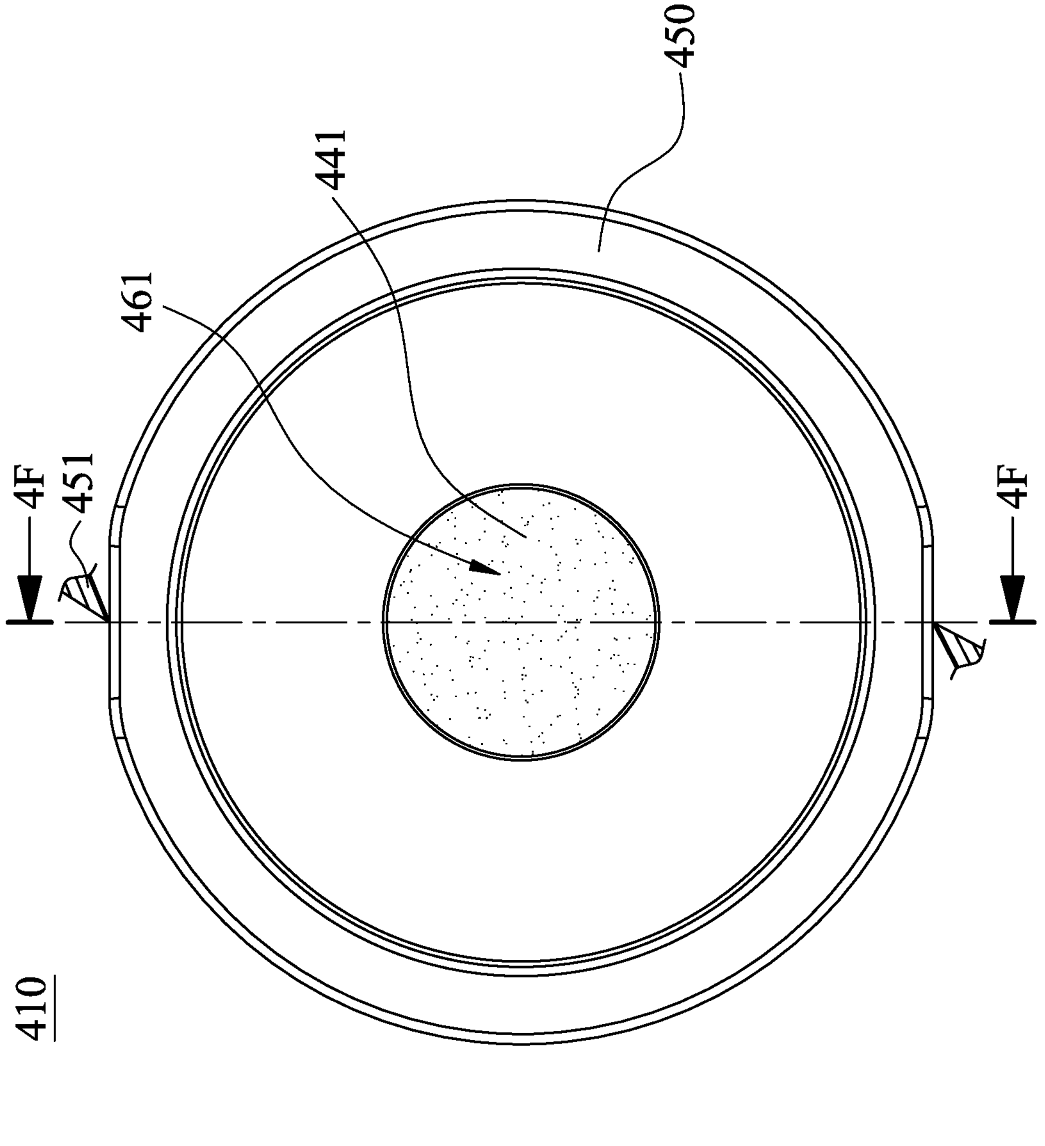
FIG. 4E is a top view of the composite lens according to the 4th embodiment in FIG. 4A.
Figure 4F:
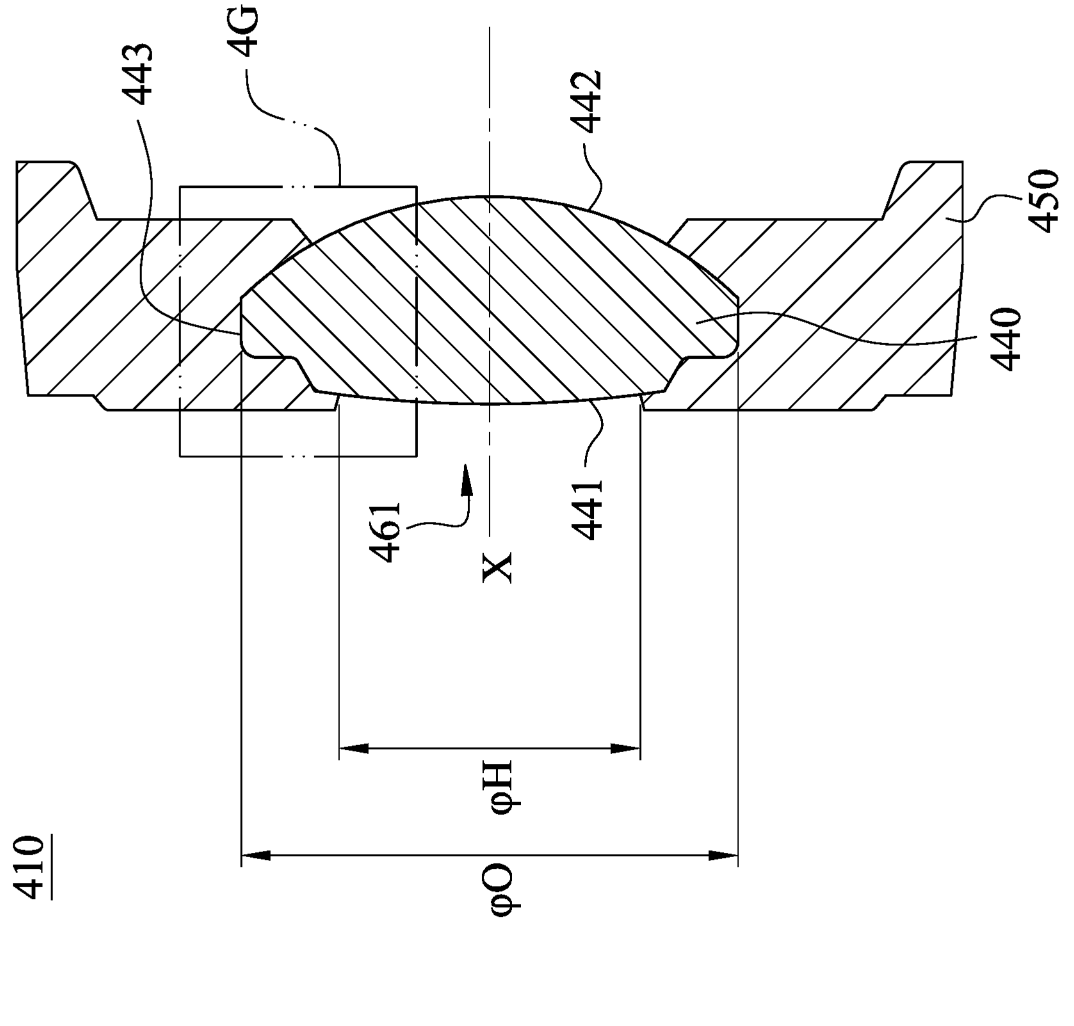
FIG. 4F is a cross-sectional view of the composite lens along a 4F-4F line in FIG. 4E.
Figure 4G:
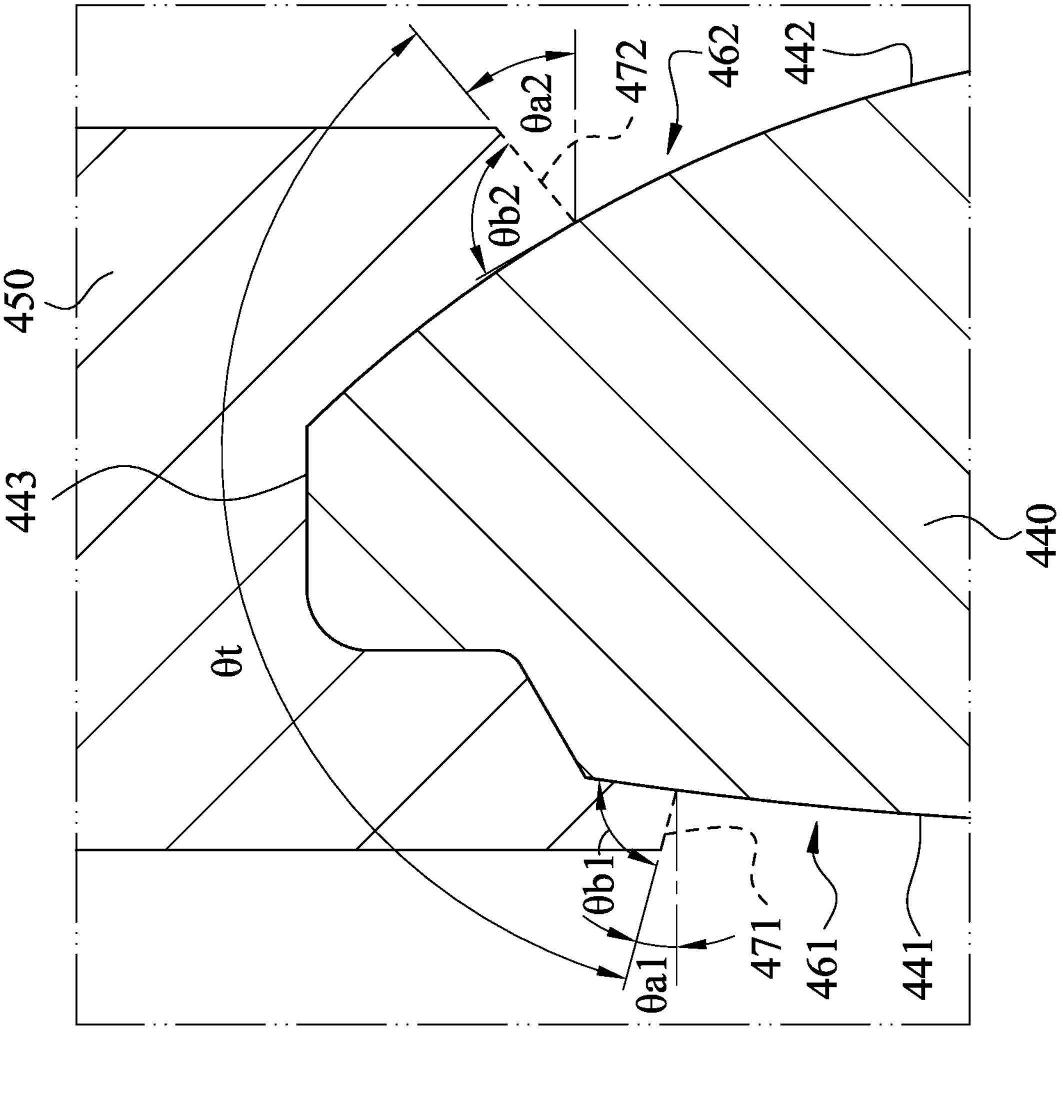
FIG. 4G is a partial enlarged view of the composite lens according to the 4th embodiment in FIG. 4F.
Figure 4H:
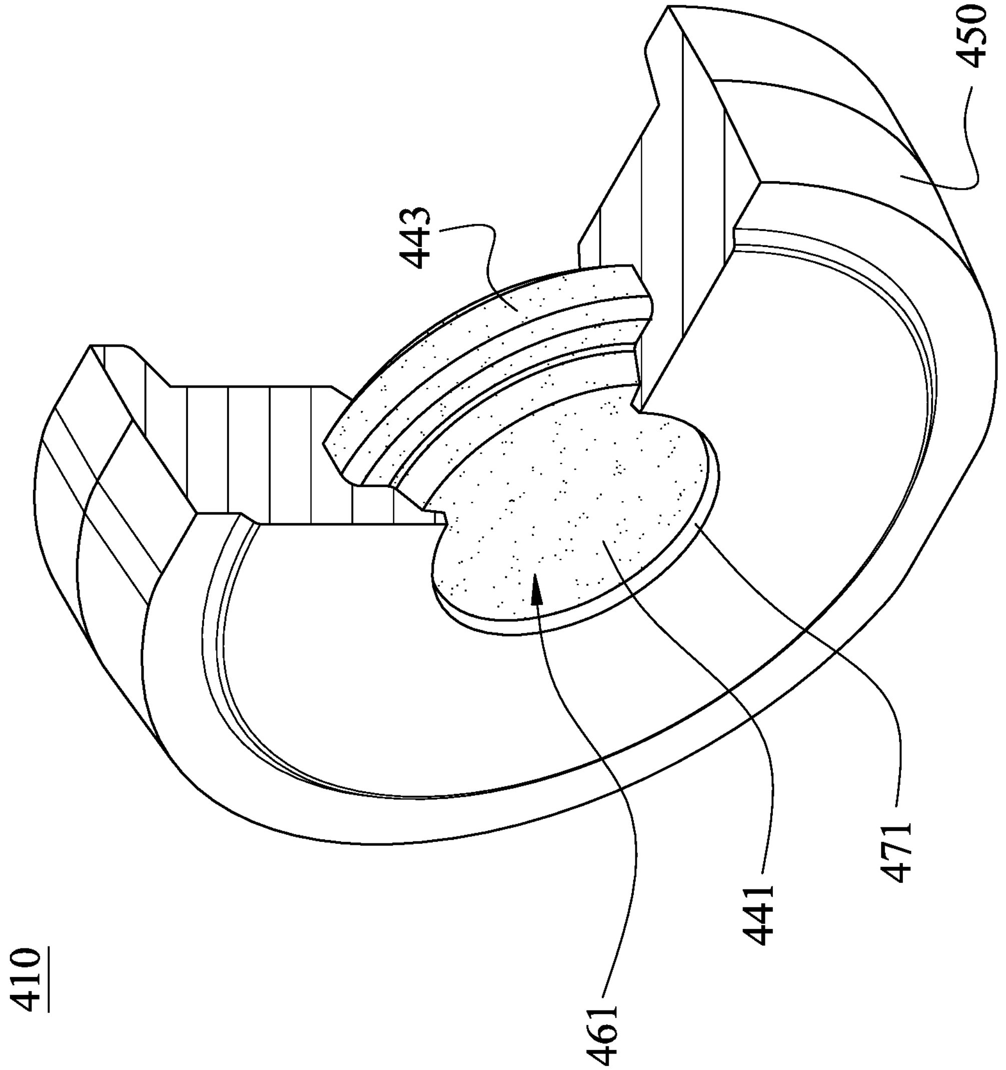
FIG. 4H is a partial cross section of the composite lens according to the 4th embodiment in FIG. 4A.
Figure 4I:
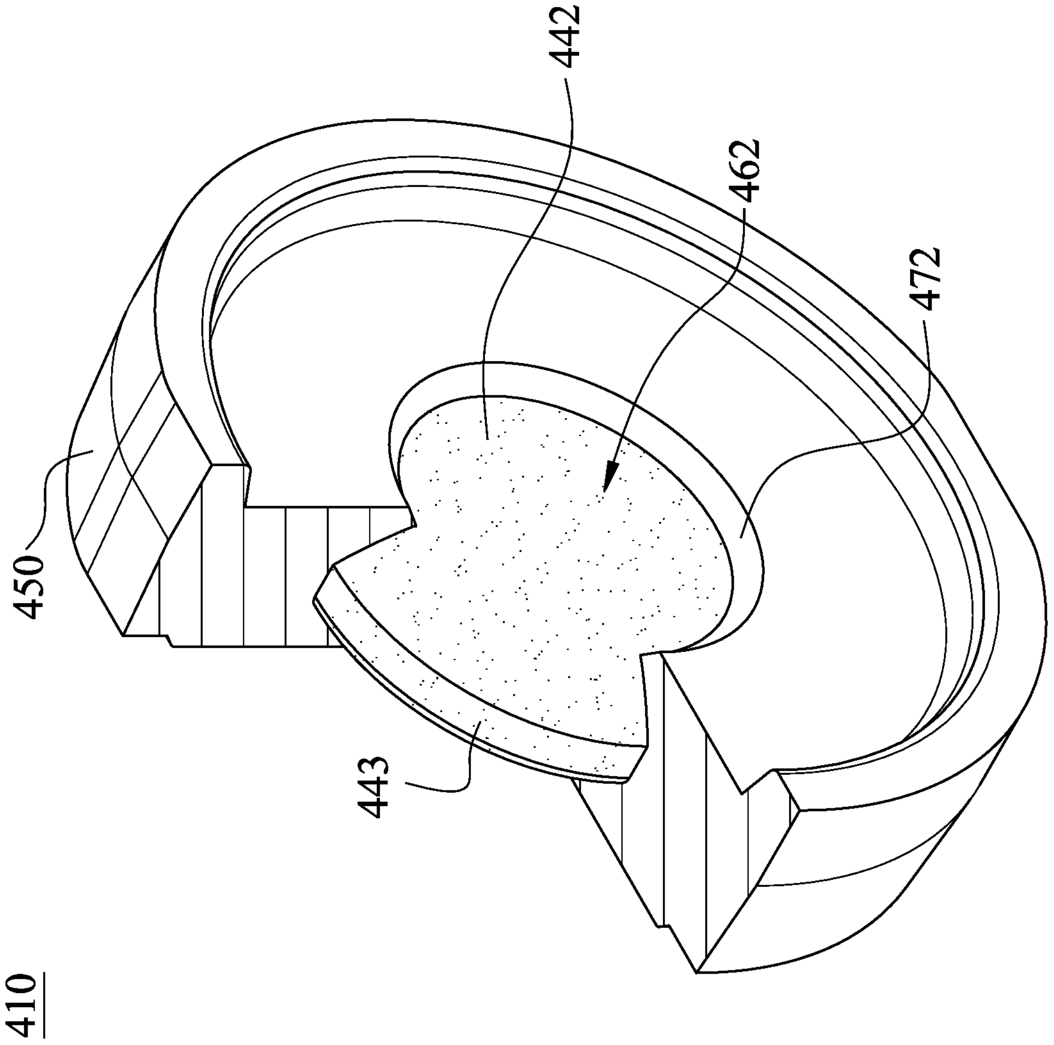
FIG. 4I is another partial cross section of the composite lens according to the 4th embodiment in FIG. 4A.

FIG. 4D is a three-dimensional perspective view of the composite lens 410 according to the 4th embodiment in FIG. 4A. FIG. 4E is a top view of the composite lens 410 according to the 4th embodiment in FIG. 4A. FIG. 4F is a cross-sectional view of the composite lens 410 along a 4F-4F line in FIG. 4E. FIG. 4G is a partial enlarged view of the composite lens 410 according to the 4th embodiment in FIG. 4F. FIG. 4H is a partial cross section of the composite lens 410 according to the 4th embodiment in FIG. 4A. FIG. 4I is another partial cross section of the composite lens 410 according to the 4th embodiment in FIG. 4A. In FIGS. 4D to 4I, the optical portion 440 includes a first optical surface 441, a second optical surface 442 and a connecting surface 443, the optical axis X passes through the optical portion 440, the extending portion 450 is opaque, the extending portion 450 surrounds and covers the connecting surface 443, and the extending portion 450 and the optical portion 440 are integrally formed. A light (not shown) passes through the first optical surface 441 to enter the optical portion 440, the second optical surface 442 is corresponding to the first optical surface 441, the light passes through the second optical surface 442 to exit the optical portion 440, and the connecting surface 443 surrounds the optical axis X and is connected to the first optical surface 441 and the second optical surface 442. It should be mentioned that the lines between the optical portion 440 and the extending portion 450 in FIG. 4C are only configured to indicate the ranges of the optical portion 440 and the extending portion 450, respectively.

In FIGS. 4D and 4E, the extending portion 450 includes two gate traces 451 axially and symmetrically disposed on the extending portion 450. Therefore, the manufacturing quality of the composite lens 410 can be improved by axially and symmetrically disposing the gate traces 451.

In FIGS. 4E and 4G to 4I, the extending portion 450 is attached to the optical portion 440 and extends towards a direction close to the optical axis X, a light through hole is formed on one of the first optical surface 441 and the second optical surface 442 via the extending portion 450, and another light through hole is formed on another one of the first optical surface 441 and the second optical surface 442 via the extending portion 450. According to the 4th embodiment, a first light through hole 461 and a second light through hole 462 are formed on the first optical surface 441 and the second optical surface 442 via the extending portion 450, respectively. Therefore, the optical portion 440 can be more stable by simultaneously covering the first optical surface 441 and the second optical surface 442 via the extending portion 450, and the stray light can be further reduced by disposing the first light through hole 461 and the second light through hole 462 on the first optical surface 441 and the second optical surface 442, respectively.

In FIGS. 4G to 4I, a contour of the light through hole is defined via an inner peripheral surface, and a contour of the another light through hole is defined via another inner peripheral surface. According to the 4th embodiment, a contour of the first light through hole 461 is defined via a first inner peripheral surface 471, and a contour of the second light through hole 462 is defined via a second inner peripheral surface 472.

In FIGS. 4C, 4F and 4G, when an angle between the first inner peripheral surface 471 and the second inner peripheral surface 472 is θt; an angle between the first inner peripheral surface 471 and the optical axis X is θa1, and an angle between the second inner peripheral surface 472 and the optical axis X is θa2; a contact angle is formed between the first inner peripheral surface 471 and the optical portion 440 on an edge of the first light through hole 461, and the contact angle is θb1; a contact angle is formed between the second inner peripheral surface 472 and the optical portion 440 on an edge of the second light through hole 462, and the contact angle is θb2; a diameter of the optical portion 440 is φO, a diameter of the light through hole (that is, the first light through hole 461) is φH, and a diameter of the lens element 424 is φL, the following conditions of Table 4 are satisfied.

TABLE 4

| 4th embodiment | | | |
|---|---|---|---|
| θt (degrees) | 125 | φO (mm) | 3.1 |
| θa1 (degrees) | 15 | φH (mm) | 1.88 |
| θa2 (degrees) | 40 | φL (mm) | 6 |
| θb1 (degrees) | 82 | φO/φH | 1.65 |
| θb2 (degrees) | 80 | φL/φO | 1.94 |

5th Embodiment

Figure 5A:
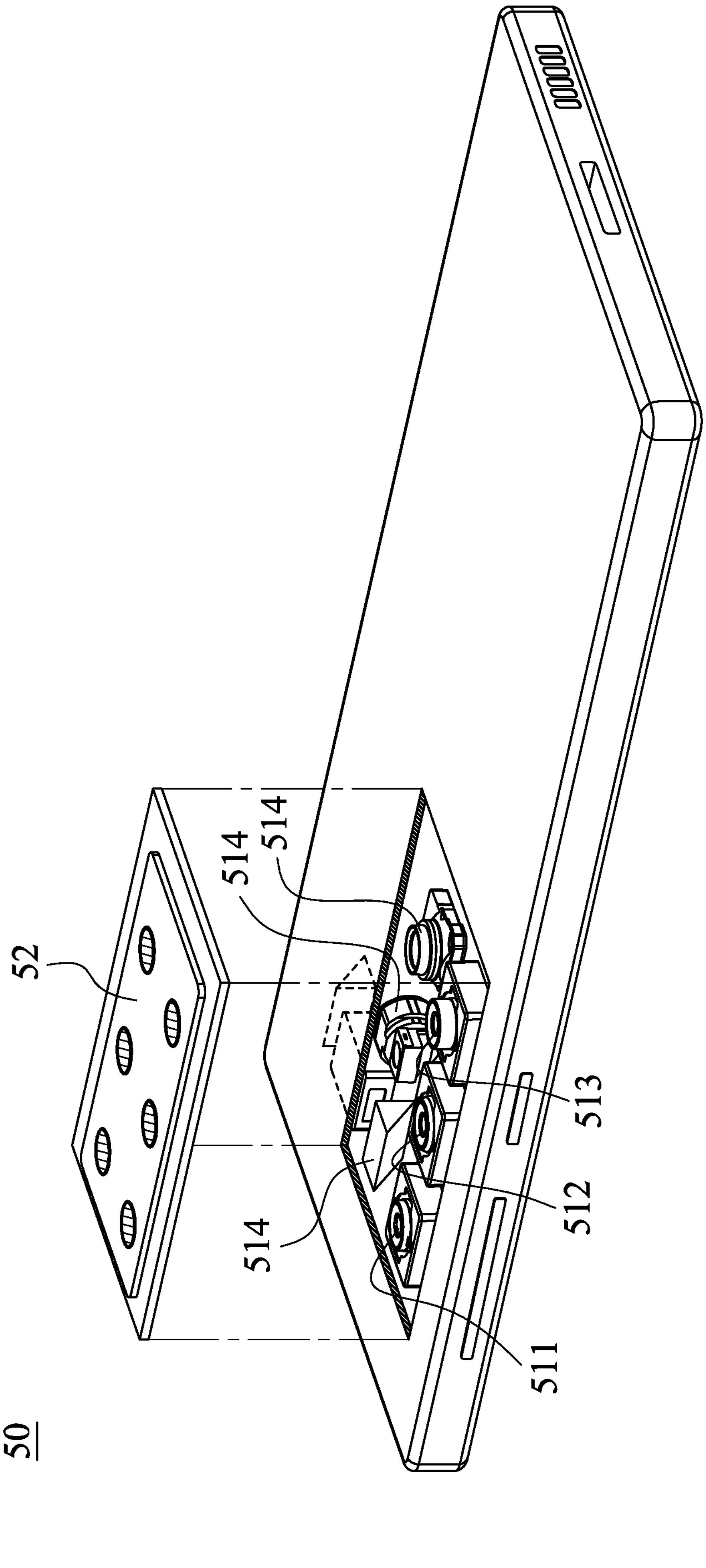
FIG. 5A is a schematic view of an electronic device according to the 5th embodiment of the present disclosure.
Figure 5B:
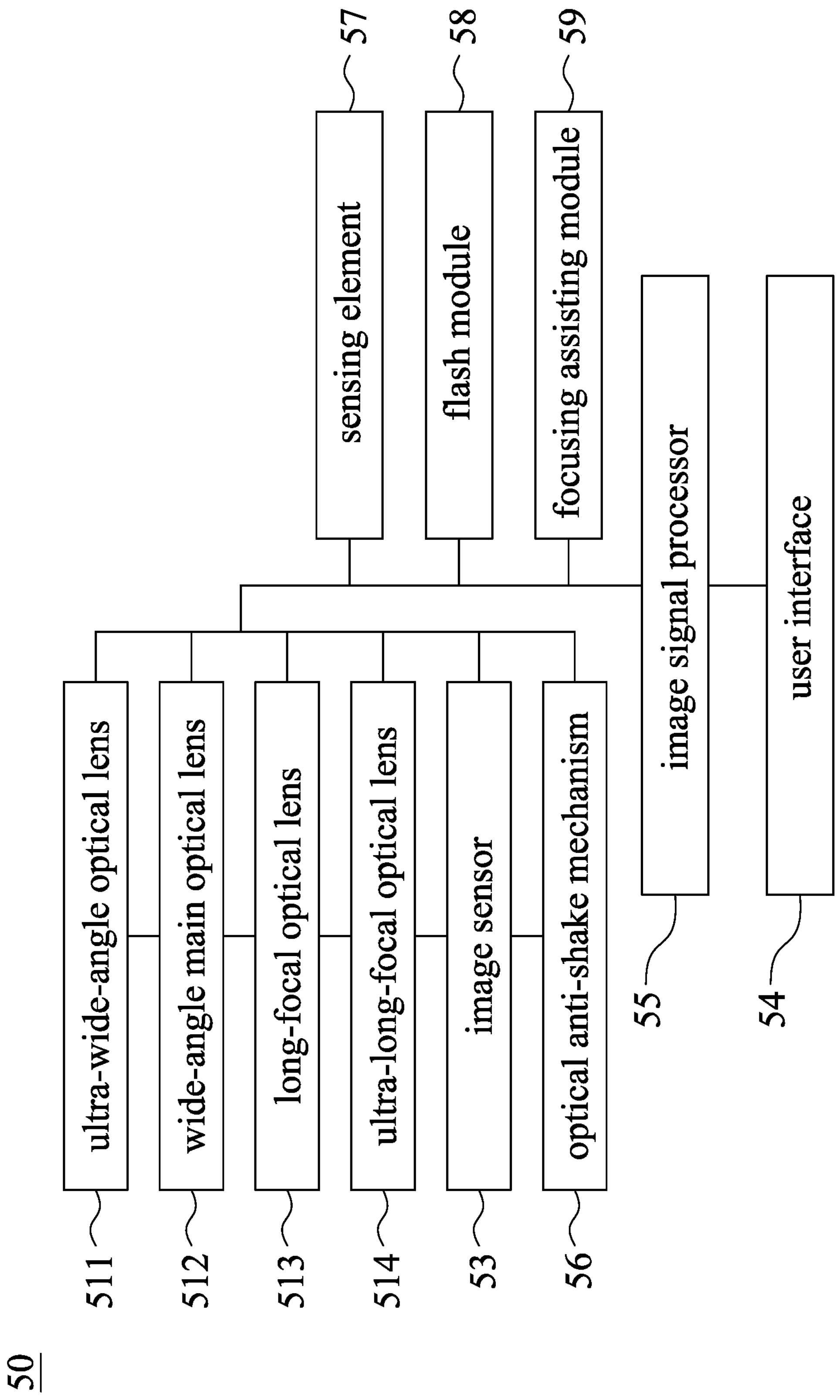
FIG. 5B is a block diagram of the electronic device according to the 5th embodiment in FIG. 5A.

FIG. 5A is a schematic view of an electronic device 50 according to the 5th embodiment of the present disclosure. FIG. 5B is a block diagram of the electronic device 50 according to the 5th embodiment in FIG. 5A. In FIGS. 5A and 5B, the electronic device 50 is a smart phone, which includes six optical lenses, and the optical lenses are an ultra-wide-angle optical lens 511, a wide-angle main optical lens 512, a long-focal optical lens 513 and three ultra-long-focal optical lenses 514, wherein each of the optical lenses includes a composite lens (not shown). According to the 5th embodiment, each of the optical lenses can be the optical lens according to the aforementioned 1st embodiment to the 4th embodiment, but the present disclosure is not limited thereto.

In detail, function of optical zoom of the electronic device 50 can be obtained by switching the optical lenses with the different visual angles. It should be mentioned that a lens cover 52 is only configured to indicate the ultra-wide-angle optical lens 511, the wide-angle main optical lens 512, the long-focal optical lens 513 and the ultra-long-focal optical lenses 514 disposed in the electronic device 50, and the schematic view is not configured to mean that the lens cover 52 is removable.

The electronic device 50 further includes an image sensor 53 and a user interface 54, wherein the image sensor 53 is disposed on an image surface (not shown) of the ultra-wide-angle optical lens 511, the wide-angle main optical lens 512, the long-focal optical lens 513 and the ultra-long-focal optical lenses 514, and the user interface 54 can be a touch screen or a display screen, but the present disclosure is not limited thereto.

Moreover, users enter a shooting mode via the user interface 54 of the electronic device 50. At this moment, the imaging light is gathered on the image sensor 53 via the ultra-wide-angle optical lens 511, the wide-angle main optical lens 512, the long-focal optical lens 513 and the ultra-long-focal optical lenses 514, and an electronic signal about an image is output to an image signal processor (ISP) 55.

To meet a specification of the electronic device 50, the electronic device 50 can further include an optical anti-shake mechanism 56, which can be an optical image stabilization (OIS). Furthermore, the electronic device 50 can further include at least one auxiliary optical element (its reference numeral is omitted) and at least one sensing element 57. According to the 5th embodiment, the auxiliary optical element is a flash module 58 and a focusing assisting module 59. The flash module 58 can be for compensating a color temperature, and the focusing assisting module 59 can be an infrared distance measurement component, a laser focus module, etc. The sensing element 57 can have functions for sensing physical momentum and kinetic energy, such as an accelerator, a gyroscope, a Hall Effect Element, to sense shaking or jitters applied by hands of the user or external environments. Accordingly, an auto-focusing mechanism and the optical anti-shake mechanism 56 disposed on the optical lenses (that is, the ultra-wide-angle optical lens 511, the wide-angle main optical lens 512, the long-focal optical lens 513 and the ultra-long-focal optical lenses 514) of the electronic device 50 can be enhanced to achieve the superior image quality. Furthermore, the electronic device 50 according to the present disclosure can have a capturing function with multiple modes, such as taking optimized selfies, high dynamic range (HDR) under a low light condition, 4K resolution recording, etc. Furthermore, the users can visually see a captured image of the camera through the touch screen and manually operate the view finding range on the touch screen to achieve the autofocus function of what you see is what you get.

Furthermore, the electronic device 50 can further include, but not be limited to, a display, a control unit, a storage unit, a random access memory (RAM), a read-only memory (ROM), or the combination thereof.

The foregoing description, for purpose of explanation, has been described with reference to specific examples. It is to be noted that Tables show different data of the different examples; however, the data of the different examples are obtained from experiments. The examples were chosen and described in order to best explain the principles of the disclosure and its practical applications, to thereby enable others skilled in the art to best utilize the disclosure and various examples with various modifications as are suited to the particular use contemplated. The examples depicted above and the appended drawings are exemplary and are not intended to be exhaustive or to limit the scope of the present disclosure to the precise forms disclosed. Many modifications and variations are possible in view of the above teachings.

What is claimed is:

1. An optical lens, comprising:

a composite lens, comprising:

an optical portion, wherein an optical axis passes through the optical portion, and the optical portion comprises:

a first optical surface, wherein a light passes through the first optical surface to enter the optical portion;

a second optical surface corresponding to the first optical surface, and the light passing through the second optical surface to exit the optical portion; and a connecting surface surrounding the optical axis and connected to the first optical surface and the second optical surface; and an extending portion surrounding and covering the connecting surface, and the extending portion supporting and fixing the optical portion;

wherein the optical portion is made of glass material, the extending portion is made of plastic material, and the extending portion comprises at least two gate traces axially and symmetrically disposed on the extending portion.

2. The optical lens of claim 1, wherein a glass transition temperature of the optical portion is TgO, a glass transition temperature of the extending portion is TgE, and the following condition is satisfied:

$$147^\circ \text{ C.} \leq TgO - TgE \leq 643^\circ \text{ C.}$$

3. The optical lens of claim 2, wherein the extending portion is opaque, and the extending portion and the optical portion are integrally formed.

4. The optical lens of claim 1, wherein the extending portion is attached to the optical portion and extends towards a direction close to the optical axis, a light through hole is formed on one of the first optical surface and the second optical surface via the extending portion, a contour of the light through hole is defined via an inner peripheral surface, an angle between the inner peripheral surface and the optical axis is Oa, and the following condition is satisfied:

$$3 \text{ degrees} < \theta a < 73 \text{ degrees.}$$

5. The optical lens of claim 4, wherein the angle between the inner peripheral surface and the optical axis is θa, and the following condition is satisfied:

$$10 \text{ degrees} < \theta a < 53 \text{ degrees.}$$

6. The optical lens of claim 4, wherein a contact angle is formed between the inner peripheral surface and the optical portion on an edge of the light through hole, the contact angle is θb, and the following condition is satisfied:

$$15 \text{ degrees} < \theta b < 87 \text{ degrees.}$$

7. The optical lens of claim 6, wherein the contact angle is Ob, and the following condition is satisfied:

$$44 \text{ degrees} < \theta b < 87 \text{ degrees.}$$

8. The optical lens of claim 4, wherein a diameter of the optical portion is φO, a diameter of the light through hole is PH, and the following condition is satisfied:

$$1.07 < \varphi O/\varphi H < 3.8.$$

9. The optical lens of claim 4, wherein another light through hole is formed on another one of the first optical surface and the second optical surface via the extending portion, a contour of the another light through hole is defined via another inner peripheral surface, the inner peripheral surface is a first inner peripheral surface, the another inner peripheral surface is a second inner peripheral surface, an angle between the first inner peripheral surface and the second inner peripheral surface is Ot, and the following condition is satisfied:

$$27 \text{ degrees} < \theta t < 171 \text{ degrees.}$$

10. The optical lens of claim 9, wherein the angle between the first inner peripheral surface and the second inner peripheral surface is θt, and the following condition is satisfied:

$$85 \text{ degrees} < \theta t < 135 \text{ degrees.}$$

11. The optical lens of claim 1, further comprising:

a lens element adjacently disposed with the composite lens along the optical axis, a diameter of the lens element is φL, a diameter of the optical portion is φO, and the following condition is satisfied:

$$1, 04 < \varphi L/\varphi O < 3.1.$$

12. The optical lens of claim 11, wherein the extending portion has a plane and a frustum surface, and the plane and the frustum surface are physically contacted with the lens element.

13. The optical lens of claim 11, wherein both of the first optical surface and the second optical surface are convex surfaces.

14. The optical lens of claim 1, wherein the extending portion further comprises a light diminishing structure, and a surface contour of the extending portion is undulating via the light diminishing structure.

15. An optical lens, comprising:

a composite lens, comprising:

an optical portion, wherein an optical axis passes through the optical portion, and the optical portion comprises:

a first optical surface, wherein a light passes through the first optical surface to enter the optical portion;

a second optical surface corresponding to the first optical surface, and the light passing through the second optical surface to exit the optical portion; and a connecting surface surrounding the optical axis and connected to the first optical surface and the second optical surface; and an extending portion surrounding and covering the connecting surface, wherein the extending portion is attached to the optical portion and extends towards a direction close to the optical axis, and a first light through hole and a second light through hole are formed on the first optical surface and the second optical surface via the extending portion, respectively;

wherein the optical portion is made of glass material, the extending portion is made of plastic material, a contour of the first light through hole is defined via a first inner peripheral surface, a contour of the second light through hole is defined via a second inner peripheral surface, an angle between the first inner peripheral surface and the second inner peripheral surface is θt, and the following condition is satisfied:

$$27 \text{ degrees} < \theta t < 171 \text{ degrees.}$$

16. The optical lens of claim 15, wherein the angle between the first inner peripheral surface and the second inner peripheral surface is θt, and the following condition is satisfied:

$$85 \text{ degrees} < \theta t < 135 \text{ degrees.}$$

17. The optical lens of claim 15, wherein a glass transition temperature of the optical portion is TgO, a glass transition temperature of the extending portion is TgE, and the following condition is satisfied:

$$147° \text{ C.} \leq TgO - TgE \leq 643° \text{ C.}$$

18. The optical lens of claim 17, wherein the extending portion is opaque, and the extending portion and the optical portion are integrally formed.

19. The optical lens of claim 15, wherein the extending portion comprises at least two gate traces axially and symmetrically disposed on the extending portion.

20. The optical lens of claim 17, wherein an angle between the first inner peripheral surface and the optical axis is θa1, and the following condition is satisfied:

$$3 \text{ degrees} < \theta a1 < 73 \text{ degrees.}$$

21. The optical lens of claim 20, wherein the angle between the first inner peripheral surface and the optical axis is θa1, and the following condition is satisfied:

$$10 \text{ degrees} < \theta a1 < 41 \text{ degrees.}$$

22. The optical lens of claim 17, wherein an angle between the second inner peripheral surface and the optical axis is θa2, and the following condition is satisfied:

$$3 \text{ degrees} < \theta a2 < 73 \text{ degrees.}$$

23. The optical lens of claim 22, wherein the angle between the second inner peripheral surface and the optical axis is θa2, and the following condition is satisfied:

$$24 \text{ degrees} < \theta a2 < 53 \text{ degrees.}$$

24. The optical lens of claim 17, wherein a contact angle is formed between the first inner peripheral surface and the optical portion on an edge of the first light through hole, the contact angle is θb1, and the following condition is satisfied:

$$15 \text{ degrees} < \theta b1 < 87 \text{ degrees.}$$

25. The optical lens of claim 24, wherein the contact angle is θb1, and the following condition is satisfied:

$$59 \text{ degrees} < \theta b1 < 87 \text{ degrees.}$$

26. The optical lens of claim 17, wherein a contact angle is formed between the second inner peripheral surface and the optical portion on an edge of the second light through hole, the contact angle is θb2, and the following condition is satisfied:

$$15 \text{ degrees} < \theta b2 < 87 \text{ degrees.}$$

27. The optical lens of claim 26, wherein the contact angle is θb2, and the following condition is satisfied:

$$44 \text{ degrees} < \theta b2 < 87 \text{ degrees.}$$

28. The optical lens of claim 17, wherein a diameter of the optical portion is φO, a diameter of the first light through hole is φH1, and the following condition is satisfied:

$$1.07 < \varphi O/\varphi H1 < 3.8.$$

29. The optical lens of claim 17, further comprising:

a lens element adjacently disposed with the composite lens along the optical axis, a diameter of the lens element is φL, a diameter of the optical portion is φO, and the following condition is satisfied:

$$1.04 < \varphi L/\varphi O < 3.1.$$

30. The optical lens of claim 29, wherein the extending portion has a plane and a frustum surface, and the plane and the frustum surface are physically contacted with the lens element.

31. The optical lens of claim 15, wherein the extending portion further comprises a light diminishing structure, and a surface contour of the extending portion is undulating via the light diminishing structure.

32. An electronic device, comprising:

the optical lens of claim 1.

33. An electronic device, comprising:

the optical lens of claim 15.

* * * * *